US008479985B1

(12) United States Patent
Kropt et al.

(10) Patent No.: US 8,479,985 B1
(45) Date of Patent: *Jul. 9, 2013

(54) BANKING SYSTEM CONTROLLED RESPONSIVE TO DATA BEARING RECORDS

(71) Applicant: Diebold Self-Service Systems division of Diebold, Incorporated, North Canton, OH (US)

(72) Inventors: Mark Kropt, Canton, OH (US); Brian McClain, Massillon, OH (US); Robert Konecny, Uniontown, OH (US); James Meek, North Canton, OH (US); Nicholas T. Billett, Jr., Massillon, OH (US); Balaji Devarasetty, Copley, OH (US)

(73) Assignee: Diebold Self-Service Systems, North Canton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/757,251

(22) Filed: Feb. 1, 2013

Related U.S. Application Data

(63) Continuation of application No. 13/066,272, filed on Apr. 11, 2011, now Pat. No. 8,365,985.

(60) Provisional application No. 61/323,161, filed on Apr. 12, 2010, provisional application No. 61/363,321, filed on Jul. 21, 2010, provisional application No. 61/405,955, filed on Oct. 22, 2010.

(51) Int. Cl.
*G06Q 40/00* (2012.01)
*G07D 11/00* (2006.01)
*G07F 19/00* (2006.01)

(52) U.S. Cl.
USPC .................. 235/379; 235/382; 235/382.5

(58) Field of Classification Search
USPC ............ 235/379, 375, 382, 382.5, 380, 376; 705/42–43, 5, 30
See application file for complete search history.

(56) References Cited

U.S. PATENT DOCUMENTS

2002/0099634 A1* 7/2002 Coutts et al. .................... 705/35
2006/0191996 A1* 8/2006 Drummond et al. .......... 235/379

* cited by examiner

*Primary Examiner* — Edwyn Labaze
(74) *Attorney, Agent, or Firm* — Christopher L. Parmelee; Ralph E. Jocke; Walker & Jocke

(57) ABSTRACT

An automated banking machine operates to cause financial transfers responsive to data read from data bearing records. The automated banking machine includes a card reader operative to read card data from user cards corresponding to financial accounts. The automated banking machine includes a display and a printer to produce records of financial transactions carried out with the machine. The automated banking machine may also include a portal device that is operative to cause the display, card reader and other devices in the machine to operate in response to communications through the portal device.

20 Claims, 12 Drawing Sheets

BANKING SYSTEM CONTROLLED RESPONSIVE TO DATA BEARING RECORDS

CROSS REFERENCE TO RELATED APPLICATIONS

This application is a continuation of U.S. application Ser. No. 13/066,272 filed Apr. 11, 2011, which claims benefit pursuant to 35 U.S.C. §119(e) of Provisional Application Nos. 61/323,161 filed Apr. 12, 2010, 61/363,321 filed Jul. 12, 2010 and 61/405,955 filed Oct. 22, 2010. The disclosures of each of these applications are incorporated herein by reference in their entirety.

TECHNICAL FIELD

This invention relates to automated banking machines that operate to cause financial transfers responsive to data read from data bearing records and which may be classified in U.S. Class 235, Subclass 379.

BACKGROUND ART

Automated banking machines may include a card reader that operates to read data from a bearer record such as a user card. The automated banking machine may operate to cause the data read from the card to be compared with other computer stored data related to the bearer or their financial accounts. The machine operates in response to the comparison determining that the bearer record corresponds to that of an authorized user, to carry out at least one transaction which may be operative to transfer value to or from at least one account. A record of the transaction is also often printed through operation of the automated banking machine and provided to the user. Automated banking machines may be used to carry out banking transactions such as dispensing cash, making deposits, transferring funds between accounts and account balance inquiries. The types of banking transactions a customer can carry out are determined by the capabilities of the particular banking machine and system, as well as the programming of the institution operating the machine.

Other types of automated banking machines may be operated by merchants to carry out commercial transactions. These transactions may include, for example, the acceptance of deposit bags, the receipt of checks or other financial instruments, the dispensing of rolled coin or other transactions required by merchants. Still other types of automated banking machines may be used by service providers in a transaction environment such as at a bank to carry out financial transactions. Such transactions may include, for example, the counting and storage of currency notes or other financial instrument sheets, the dispensing of notes or other sheets, the imaging of checks or other financial instruments, and other types of transactions. For purposes of this disclosure an automated banking machine, automated transaction machine, or automated teller machine shall be deemed to include any machine that may be used to automatically carry out transactions involving transfers of value.

Automated banking machines may benefit from improvements.

OBJECTS OF EXAMPLE EMBODIMENTS

It is an object of an example embodiment to provide a banking system apparatus that is operated responsive to data bearing records.

It is an object of an example embodiment to provide an automated banking machine.

It is an object of an example embodiment to provide an automated banking machine at which a user may conduct banking transactions.

It is a further object of an example embodiment to provide an automated banking machine which has improvements.

Further objects of example embodiments will be made apparent in the following Detailed Description of Example Embodiments and the appended claims.

The foregoing objects are accomplished in example embodiments with an automated banking machine that is operative responsive to data bearing records to cause financial transactions to be carried out. The automated banking machine may include a portal device that includes a plurality of device ports, a network port, and at least one display port. The automated banking machine may also include at least one visual display in operative connection with the display port and a plurality of devices in operative connection with the device ports. In example embodiments, the plurality of devices may include a card reader that is operative to read data on user cards corresponding to financial accounts. The example devices may also include a cash dispenser, a keypad, a receipt printer, check acceptor, note acceptor, note recycler, document printer, radiation sensor, bar code reader, RF communication interface, camera, biometric reader, and any other devices operative to facilitate conducting banking transactions or other transactions at the automated banking machine.

In example embodiments, the plurality of devices is operative to communicate device bus communications through the device ports. The portal device is operative to communicate through a TCP/IP network, the device bus communications between the devices and at least one remote computer. The remote computer is alternatively referred to herein as a remote server. These device bus communications cause the devices in the automated banking machine to operate to enable the automated banking machine to carry out a financial transaction such as the dispense of cash through operation of the cash dispenser.

In example embodiments the remote server may correspond to one or more remote computers that are each adapted to control a respective automated banking machine having a portal device. Also in example embodiments the remote computer may include a plurality of virtual machines running on a hypervisor, which virtual machines are each adapted to control a respective automated banking machine having a portal device. In these described example embodiments the software stack including the computer executable instructions that execute to generate a user interface and operate the devices on the automated banking machine, operates on the remote computers or virtual machines rather than on a local computer within the housing of the banking machine. To facilitate the control of banking machine devices and the display, the portal devices and the remote computer may be adapted to use a remote client protocol over a TCP/IP network to communicate device and display communications between the remote computer and the portal devices in the banking machines.

DETAILED DESCRIPTION OF EXAMPLE EMBODIMENTS

Figure 1:
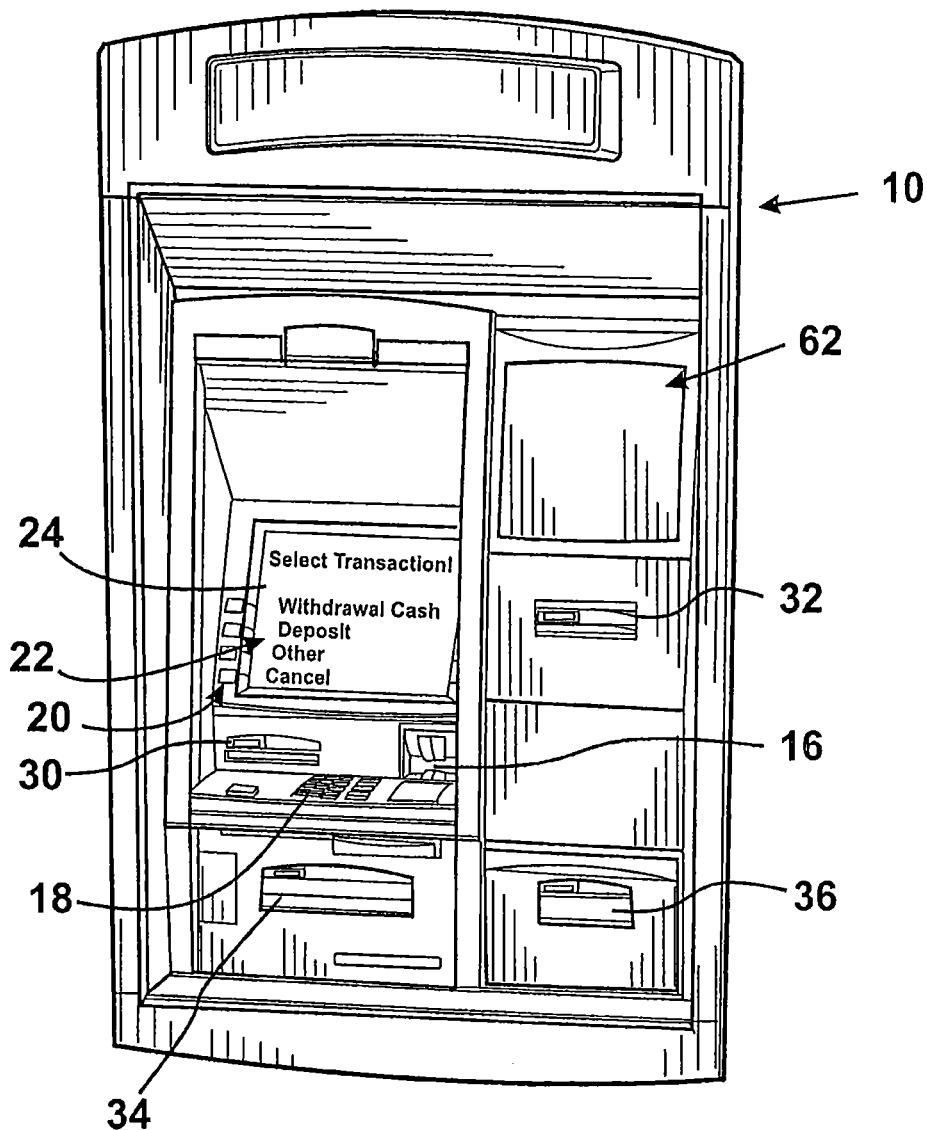
FIG. 1 is a front perspective view of an automated banking machine that operates responsive to data read from data bearing records of an example embodiment.
Figure 2:
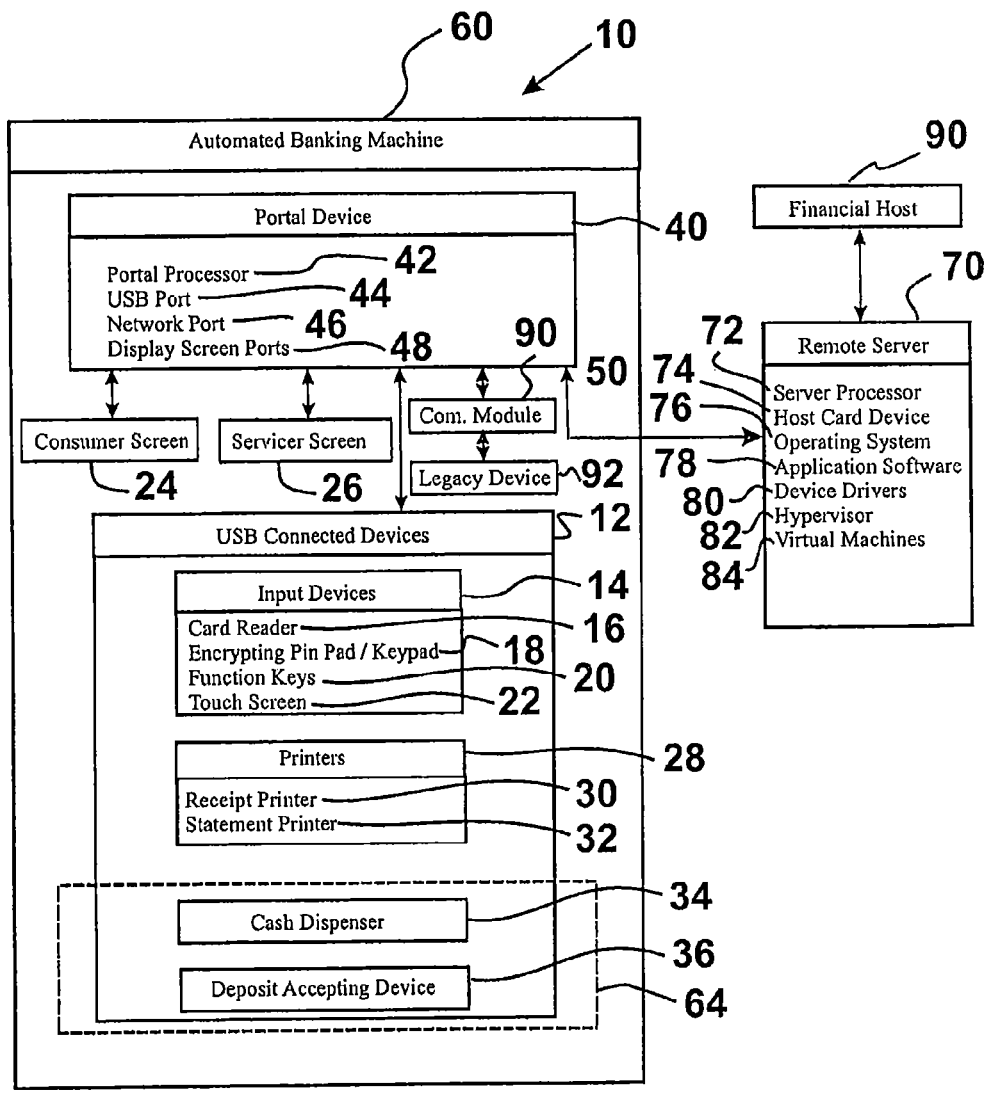
FIG. 2 is a schematic view of example components of an automated banking machine.

Referring now to the drawings, and particularly to FIGS. 1-2, there is shown therein an automated banking machine of a first example embodiment, generally indicated 10. In this example embodiment, automated banking machine 10 is an automated teller machine (ATM), but in other example embodiments other types of automated banking machines may be used. Machine 10 includes a housing 60 (illustrated schematically in FIG. 2). One open side of the housing covered via a fascia 62 (illustrated in a perspective view in FIG. 1). The housing is used to house and operatively support certain banking machine components (e.g., hardware devices) that facilitate carrying out banking transactions with the automated banking machine. Such components may include a plurality of input devices 14 that are operative to receive from users inputs of selections and data used in carrying out banking transactions or other transactions.

In an example embodiment such input devices may include a card reader schematically indicated 16. Card reader 16 is operative to read data included on a data bearing record such as a customer's card which includes indicia thereon. The indicia may be encoded on a magnetic stripe of the card. The indicia may correspond to information about the customer and/or information about a customer's financial account, such as the customer's name and account number. In some embodiments the card reader 14 may be a card reader adapted for reading magnetic stripe cards and/or so-called "smart cards" which include a computer chip having a programmable memory. Other example embodiments may read data from cards wirelessly such as radio frequency identification (RFID) cards. Other example embodiments may include wireless interface circuitry which is operative to read card data from a portable device such as a mobile phone. Example embodiments may include features of the types discussed in U.S. Pat. Nos. 7,118,031 and 7,896,235 the disclosures of which are incorporated herein by reference in their entirety.

Also, in example embodiments, the banking machine 10 may include input devices such as manual input keys. Input keys may in some embodiments, be arranged in a keypad 18 of an encrypting pin pad (EPP). Input keys may alternately or in addition include keys in a QWERTY keyboard, or function keys 20 adjacent to the display or other places, or other types of physical keys or buttons for receiving manual inputs. Also, input devices may include a touch screen 22 which comprises at least one sensor through which a customer provides manual inputs by touching an overlying surface of a display 24. In addition, it should be understood that in various embodiments other types of input devices may be used such as biometric readers such as fingerprint or iris scan readers, speech or voice sensing devices and recognition circuitry, inductance type readers, infrared (IR) type readers, radio frequency type readers, cameras and other types of devices which are capable of receiving inputs from a person, article or computing device and/or is capable of receiving information that identifies a customer and/or their account.

The example embodiment of the banking machine 10 also includes output devices that provide outputs to users. Such output devices may include one or more displays such as the consumer display 24 capable of providing visible indicia to a customer. Some embodiments of a banking machine may include a secondary display such as a servicer display 26 that is capable of providing visible indicia to a service technician that provides service and maintenance for the banking machine. Such displays may include an LCD, CRT, OLED or other types of displays that output visible indicia. In other embodiments, output devices may include devices such as audio speakers, radio frequency (RF) transmitters/interfaces, IR transmitters/interfaces, or other types of devices that are capable of providing outputs which may be perceived by a user either directly or through use of a computing device, article or machine. It should be understood that example embodiments may also include combined input and output devices such as the touch screen display and interface circuitry for visible, RF and/or IR communication signals which are capable of providing outputs as well as receiving inputs.

In example embodiments of the banking machine 10, the output devices may also include one or more printers 28, such as a receipt printer 30 that is operative to print receipts for users reflecting transactions conducted at the machine. Embodiments may also include other types of printing mechanisms such as statement printer mechanisms 32, ticket printing mechanisms, check printing mechanisms and other devices that operate to apply indicia to media in the course of performing transactions carried out with the machine.

As illustrated in FIG. 2, the housing 60 of the banking machine 10 may further include a safe which is also referred to herein as a chest 64 enclosing a secure area. The secure area inside the chest is used in the example embodiments to house critical components and valuable documents. In some example embodiments, the chest may be used for housing currency, and a cash dispenser 34 which operates to dispense cash stored in the chest and make it accessible to a user outside the machine. Other example embodiments may include currency stackers, deposit accepting devices 36 and other banking machine components. For purposes of this disclosure a cash dispenser shall include any device or group of devices or mechanisms that takes currency stored within the machine and makes such currency accessible from outside the machine. Cash dispensers may include features of the type disclosed in U.S. Pat. Nos. 7,261,236; 7,240,829; 7,114,006;

7,140,607 and 6,945,526 the disclosures of each of which are incorporated herein by reference in their entirety. In example embodiments, the cash dispenser is operative to pick currency sheets from a stack of sheets housed in one or more canisters in the chest. The picked currency sheets may be arranged by a currency stacker mechanism for presentation through a delivery mechanism which operates to present a stack of notes or other documents to a customer.

In some embodiments, the banking machine may include one or more processors incorporated into a general purpose x86 based computer mounted inside the housing of the banking machine. However, as illustrated in FIG. 2, in another example embodiment, the processor may correspond to a portal processor 42 that is incorporated into a portal device 40 mounted inside the housing of the banking machine. Unlike a general purpose computer, such portal device 40 may not be capable of running a general purpose personal computer operating system such as a version of Microsoft Windows. Rather, the portal device may include circuits and firmware dedicated to carrying out a remote client protocol in order to communicate device and display communications between the various components in the banking machine and a remote server via a network. Example embodiments of the portal devices described herein may correspond to zero client devices. Examples of zero client devices used in business environments include a Wyse P20 and a Dell FX100. Zero client devices or very thin client devices may also be constructed for specialized purposes, including operating input and output devices and other devices of the types used in specialized machines such as automated banking machines. For purposes of this disclosure, a "portal device" shall include one or more devices which are dedicated to the function of communicating device communication messages with devices included in an automated banking machine including communicating display messages with one or more displays in an automated banking machine, and also communicating such device communication messages (including display messages) to and from an external network.

In an example embodiment, the portal device 40 may include a plurality of device ports 44, a network port 46, and one or more display ports 48 in operative connection with the portal processor 42. In this example embodiment, the previously described display(s) 24, 26 are in operative connection with the display ports 48 of the portal device. Also, the other previously described non-display devices (referenced with numeral 12 in FIG. 2) such as the card reader 16, cash dispenser 34, touch screen 22, EPP/keypad 18, function keys, receipt printer 30, wireless interface circuitry and other devices are in operative connection with the device ports 44 of the portal device. In addition, a TCP/IP network 50 may be connected to the network port 46 of the portal device via an Ethernet cable or other network cable or connector. For purposes of this disclosure, a "port" shall include a connector for providing communications, and will generally include the electrical connections described herein, which will also be deemed to encompass other types of communication connections such as connections made by radio frequency (RF), fiberoptic connections, and other types of connections which enable message and data communication.

The device ports 44 of the portal devices are operative to communicate (i.e., receive and/or send) device bus communications with the devices 12. Also the display ports 48 of the portal devices are operative to communicate display communications with the devices which comprise display(s) 24, 26. In addition, the network port 46 of the portal device is operative to communicate network communications with the TCP/IP network 50 in order to communicate the device bus communications and display communications between the portal device 40 and a specified remote server 70. In this described example embodiment, the device bus communications are operative to cause the devices 12 in the automated banking machine to operate; and the display communications are operative to transmit image screen data to a display to cause the display to output visible indicia.

In general, such communications enable the remote server 70 to cause the banking machine to carry out a plurality of different financial transactions such as the dispense of cash through operation of the cash dispenser, the deposit of a check through operation of a check accepting device, the transfer of value between accounts, or any other financial transaction that is capable of being performed by an automated banking machine.

In an example embodiment, the remote server includes at least one server processor 72 and at least one operating system 76 operative in the at least one server processor. Here the operating system at the remote server may correspond to a general purpose x86 compatible operating system such one or more versions or distributions of Microsoft XP Professional, Microsoft Windows 7, OS/2, Linux, or any other operating system on which one or more automated banking machine software applications 78 may be configured to operate to cause remote operation of the devices and displays connected to the portal device 40 in the described example automated banking machine 10.

In an example embodiment, the server may include a dedicated host card interface device 74 that is compatible with the portal device 40 included in the banking machine 10. As used herein, a portal device (at the banking machine) and a host card interface device (at the remote server) are compatible with each other by being operative to communicate with each other using the same remote client protocol that is usable to communicate the device communications of the banking machine including device bus communications and the display communications. For example, in an example embodiment, the portal device and the host card interface device may include processor/controllers adapted to carrying out the Teradici™ PC over IP (PCoIP) protocol. Such a PCoIP protocol is operative to communicate device bus communications corresponding to Universal Serial Bus (USB) communications over a TCP/IP network. Of course this approach is exemplary and in other embodiments, other communication protocols may be used.

However, it should be understood that in some example embodiments, dedicated portal devices and/or host interface cards may not be used. Rather, software operating in the remote server (and/or a computer at the banking machine) may carry out the described functions of the host interface card device (and/or portal device). For example, as explained in more detail below, the remote server 70 may include a hypervisor 82 operative to execute software instructions which correspond to a plurality of virtual machines 84. Each virtual machine corresponds to the components of the automated banking machine including software components that cause the operation thereof. Such a hypervisor may include software instructions added thereto and/or integrated therewith (e.g., VMware View 4 agent available from VMware or other similar product) which implements communications using the PCoIP protocol (or other remote client protocol). The server communicates device communications using the PCoIP protocol (or other remote client protocol) between one or more portal devices in automated banking machines connected via at least one network with the server and corresponding virtual machines operating on the hypervisor. Also for example, in some example alternative embodiments, rather than having a portal device in the banking machine, the banking machine may include a local computer that executes software (e.g., VMware View 4 client available from VMware or other similar product), which implements the PCoIP protocol (or other remote client protocol) in order to communicate device communications between devices connected to the local computer in the banking machine and the remote server.

In some example embodiments, the device ports of the PCoIP compatible portal device may correspond to USB ports (e.g., compatible with USB 1.1, 2.0, and/or 3.0 USB specifications, for example). When devices 12 of the banking machine 60 are connected to the USB ports of the portal device, the PCoIP communications between the portal device and remote server (across a TCP/IP network) are received, processed and presented by host card interface device and/or hypervisor to other software components at the remote server 70 as USB communications in a form that is equivalent to the devices being connected to local USB ports at the remote server, or to local USB ports of the virtual machine at the remote server. With this arrangement, USB device drivers 80 may be installed in operative connection with the operating system 76 operating on the remote server, or an operating system 78 of a virtual machine 84 at the remote server, which USB device drivers provide the operating system 76 and one or more banking machine software applications 78, with the ability to communicate with and/or control the operation of the USB devices 12 at the remote automated banking machine.

For example, the portal device 40 may be operative to receive card reader USB communications from the card reader through the USB port (e.g., communications including an account number read from a user card). The portal device may then be operative to communicate such card reader communications through the TCP/IP network 50 (using PCoIP) to the remote server. The host card interface device 74 (and/or hypervisor) on the remote server may then communicate the card reader communications to a USB card reader device driver software component, which then communicates data in the USB communication (e.g., a signal that a card is sensed adjacent the card reader) to a software application 78. Also, for example, the banking machine software application 78 may be operative to access the USB card reader device driver operating in the remote server, to communicate card reader USB communications using PCoIP) by the host card interface device 74 or through hypervisor 82, over the TCP/IP network 50 to the portal device 40. The portal device 40 may then communicate the received card reader USB communications to the USB port that the card reader 16 is connected to cause the card reader to carry out a function (e.g., open a shutter to allow entry of the card into the card reader and run the transport within the card reader to move the card past a magnetic read head).

As the card reader operates, the card reader provides USB communications through the portal device. The portal device then passes the communications in the form of a plurality of messages through the network and to the remote server. At the remote server, the device driver and banking machine software application receive and process the communications from the card reader and provide responsive communications based on the software instructions included in the banking machine application. This includes, for example, instructing the card reader in its operation to communicate in a manner that delivers the card data read from the card such that communications through the portal device, through the network and to the remote server cause the card data to be received by the banking machine application running in the remote server.

Likewise, the banking machine application determines actions to be taken by the card reader in response to the banking machine application executing the instructions thereof to carry out the user's particular selected transaction. This may include, for example, the banking machine application causing the communication of messages from the server to the portal device and to the card reader, which cause the card reader to operate to open the shutter and return the card to a user. Alternatively, such instructions may result in messages which operate the card reader to cause the card to be moved so as to be captured by the machine. This may be done, for example, if messages received by the banking machine application from other software processes or computers indicate that the card data corresponds to a stolen card or other circumstances which indicate that the card should not be returned to the user. Thus, in this example embodiment, the banking machine application operating in the remote server is operative to control each of the operations and activities of the card reader and receives the data that is by the card reader, remotely through the network in a manner that corresponds to that which would occur if the banking machine software application and software driver were operating in a computer that was located within the housing of the banking machine.

Similarly, during operation of the banking machine, the banking machine software application 78 operating remotely is operative to cause outputs through the customer display on the banking machine. Such outputs may prompt a user to input their personal identification number (PIN). The application will further operate to send messages to enable the EPP of the banking machine to accept manual inputs through the keys thereon, and to encrypt the data corresponding to such manual key inputs. This is accomplished by the EPP receiving one or more communications from the remote server through the portal device which causes the EPP to perform such functions. Further in some exemplary embodiments the communications received through the portal device by the EPP may include data corresponding to card data read through operation of the card reader or other data which is used in operation of the EPP. The EPP may then operate responsive to operation of an internal processor and data stored in the EPP to provide device communications including data corresponding to encrypted PIN data and/or encrypted PIN data, card data and/or other data.

The data from the EPP is passed as one or more device communication messages through the portal device which transmits the data through the network to the remote computer operating the automated banking machine application. The automated banking machine application responsive to receiving the network communication, then operates to determine what next actions are to be taken during operation of the banking machine to carry out the transaction. In some example embodiments this may include causing the display of the banking machine to indicate to the customer that they should wait while the transaction is processed. Alternatively or in addition, in some arrangements this may include providing to the customer certain marketing messages or other outputs which are presented to the user. In response to resolving data corresponding to the presentation to be made to the user through the display, the banking machine application operating in the remote server causes messages to be passed through the network which are received by the portal device and which are operative to cause the display to output the desired message or messages. It should be understood that such messages may include various types of messages that can be output through such a display. These may include text type messages as well as graphics or video messages including video messages which include an audio component. This all depends on the programming of the system and the capabilities of the machine.

It should also be understood that in some embodiments the automated banking machine may be operated in a manner that is suitable for use by visually impaired users. This may include, for example, the banking machine devices detecting the connection of a headphone to a headphone jack or other device on the banking machine and/or receiving a user input requesting voice guided operation, and causing messages corresponding thereto through the device portal to be passed to the remote computer. In response thereto, the banking machine application running in the remote compute may cause the banking machine devices to run in a manner consistent with machine operation for a visually impaired user. This will include passing signals corresponding to audio instruction messages through the portal device and through the headphone jack to the headphones or other assistance device used by the banking machine user. It may also include passing through the portal device to the banking machine application operating at the remote computer the messages corresponding to the key inputs or other types of inputs provided by the machine user to indicate identifying data, transaction type, amount information or other data which must be provided to the application operating in the remote computer in order to carry out the user's requested transaction.

Other devices in the banking machine may be operated in a similar manner, (e.g., remotely communicated cash dispenser USB communications that cause a cash dispenser to dispense cash responsive to the application operating in the remote computer determining that the account data and PIN corresponds to an authorized user entitled to receive a requested amount of cash; and remotely communicated cash dispenser USB communications regarding the outcome of a cash dispense). It is to be understood that remote USB communications between the portal device and remote server for a cash dispenser or other device in the banking machine may include USB communications that are capable of being carried out by local USB devices connected to a local computer. For example, such remotely communicated USB communications may include authentication protocols and encrypted communications that reduce the risk of unauthorized operation of devices and/or interception of user input data. Examples of authentication protocols and approaches to encrypted communications that may be used are described in U.S. patent application Ser. No. 11/811,864 filed Jun. 11, 2007, which is hereby incorporated herein by reference in its entirety.

Also, in this described example embodiment, the display port of the PCoIP compatible portal device may correspond to a standard PC video port such as VGA port, DVI port, HDMI port, and display port. Alternatively the port may comprise a wireless communication port. In the example embodiment, when the display 24 of the banking machine is connected to the portal device, the PCoIP communications between the portal device and remote server (across a TCP/IP network) are operative to be presented by the host card interface device and/or hypervisor at the remote server 70 as display communications in a form that is comparable to the display being connected to a local display port (e.g., VGA, DVI, HDMI, display port) at the remote server and/or display port of a virtual machine at the remote server. With this arrangement, display device drivers 80 may be installed in operative connection with the operating system 76 of the remote server or a virtual machine of the remote server, which provides the operating system 76 and/or one or more banking machine software applications 78 with the ability to cause the output graphical user interfaces, desktops, application windows, command terminals, and/or other visible indicia, through the display 24 at the banking machine.

Thus, in the course of conducting a banking machine transaction of an example embodiment, the devices and the consumer display screen of the automated banking machine are operated in a ready state in response to communications from the remote server through the portal device. This may include the received signals causing the display to output messages designed to attract the user's attention as well as instructions such as a statement advising a customer to insert their card in order to commence a transaction.

In response to a device on the banking machine sensing a change in condition such as a sensor on the card reader sensing a magnetic stripe of a user card adjacent to the card reader slot, the card reader operates to communicate to the portal device and through the network, device communications corresponding to the condition of a user card being sensed. The banking machine application in an operative state resolves the next device action and causes the remote server to communicate and respond with messages through the network and the portal device to control the card reader. This includes, for example, instructions which cause the card reader to open the shutter to a card reader opening, allowing insertion of the card. It may also include sending device communications causing the card to move in the card reader and to cause the card reader to move the card adjacent to a magnetic read head so as to read magnetic stripe data on the card. Communications between the card reader through the portal device to the remote server causes information regarding the card to be received in response to messages from the application which cause the operation of the card reader to be sent. This may include, for example, the communication of messages through the portal device indicating data from the card reader which corresponds to an account as well as the name of the person associated with the card which is encoded on the magnetic stripe of the card. The application operating in the remote server may operate in response, at least in part, to this data to cause device messages to the portal device which include data corresponding to the user name and which are operative to cause the display to provide a welcome screen output including the name of the individual corresponding to the data read from the card.

In an example transaction, the application operating in the remote server may cause communication through the portal device with the encrypting PIN pad to enable the encrypting PIN pad to receive inputs. The communications may also cause the encrypting PIN pad to operate in a mode where it encrypts the input data received through the keys from a user. The messages sent from the remote server responsive to the banking machine application may also include messages through the portal device that operate to cause the display to output a message prompting the user to input their personal identification number through the keypad. The EPP receives the input PIN data from the user and operates responsive to the EPP's internal programming to encrypt the input PIN data. In some example embodiments the EPP may also receive account data read by the card reader from the card and/or other data in messages through the portal device from the remote server. The EPP or another input device also operates responsive to messages passed through the portal device prompting the user through display outputs to indicate when the user has completed the input of their PIN number.

In the exemplary embodiment the EPP provides messages through the portal device which are indicative that the PIN data has been received. In some embodiments, this may include encrypted PIN data or other data which is received at the remote computer. Alternatively, the EPP may provide one or more communications to indicate that the PIN data has been received and operate to send the encrypted data at a later time in the course of the transaction. This may be controlled, for example, through the banking machine application operating in the remote computer.

The banking machine application in an example transaction sequence may then operate to cause outputs to be provided through the display through communication messages sent through the network and the portal device. For example, the display may be caused to output a prompt to a user to select a particular transaction type. In response to this prompt, the user may select a type of transaction by pressing a function key, for example, or otherwise providing an input through another one of the input devices such as a touch screen input or pressing a particular keypad key. The input from the user causes the generation of a device message which is passed through the portal device to the remotely operating banking machine application.

The banking machine application may then operate in accordance with its programming to cause a message to be passed through the portal device to the display to prompt a user to indicate an amount associated with their transaction. For example, in this example where a user may select a cash withdrawal, the message through the display operates to prompt the user to indicate the amount they would like to receive by providing inputs through the EPP. Messages from the application may also operate to control the EPP so as to operate to receive the amount input and also not encrypt the data corresponding to the amount so as to facilitate the transaction. The messages provided through the display may also prompt a user to provide a particular input through an input device such as pressing a key when they have completed the input of the amount.

Responsive to the user inputs, the remotely operating banking machine software application controls the operation of the devices to cause messages to be delivered through the portal device to the remote computer. The remote computer then operates to cause the information about the account and PIN data, withdrawal transaction request and amount to be communicated to one or more remote computers that can authorize the transaction. These remote computers may be, for example, a host computer associated with the banking institution corresponding to the card data read through operation of the card reader device. The host computer will respond with one or more messages indicating to the banking machine application operating in the computer remote from the banking machine, whether the transaction is authorized or not. While this process is occurring, the banking machine application operates to cause communications through the portal device to cause the display screen to output messages asking the customer to wait or to output messages including advertising or other materials.

In this example transaction, responsive to receiving one or more messages from the host computer that the transaction is authorized, the banking machine application operating in the remote computer will send messages through the network and the portal device to operate the cash dispenser. Such messages will control the cash dispenser to cause certain bills to be picked from holding canisters, the bills to be stacked, and the stack of bills to be presented. In the exemplary embodiment, messages through the portal device control each component of the cash dispenser to cause each action to occur. The cash dispenser will operate in accordance with these messages to cause the amount of cash requested by the user to be dispensed. Messages from the cash dispenser indicating the dispensing activity are returned through the portal device to the application. These messages may include messages concerning the dispensing action and the completion of the dispensing activity. Further in the event of a malfunction or if the user fails to take dispensed cash, messages from the remote computer through the portal device can cause dispensed bills to be retracted into the machine and/or picked bills not yet dispensed to be routed to a storage location. In response to such messages passed through the portal device to the remote service, the banking machine application may send messages through the portal device controlling the display to prompt a user to take their cash from the machine.

Also, at a time proximate to the cash dispense activity, the banking machine application will cause messages to be sent through the portal device to the receipt printer. The messages to the receipt printer will include the instructions which are passed to the receipt printer to cause the printing of a receipt for the user. The remotely operating banking machine application causes the receipt printer to print the desired information and to cause the receipt to be presented from the machine to the user. The remotely operating application also causes messages through the portal device to prompt the user through the display to take the receipt. The sensors associated with the printer and/or the cash dispenser are also operative to communicate device messages through the portal device to indicate to the remotely operating banking machine application that the requested functions were carried out successfully and that the user took their cash and receipt. In response the banking machine application may send through the network and the portal device, the messages to present the user with a "thank you" screen and then messages to cause the screen to return to the mode which would prompt a later user to input their card. Also in the example transaction embodiment, the remotely operating banking machine application operates to send one or more messages to the transaction host computer associated with the bank or other institution, indicating that the transaction was successfully completed which causes the particular account corresponding to the card data to be assessed the amount of the cash dispensed in the transaction.

Of course, it should be understood that other transactions can be carried out at the automated banking machine through similar messages through communications via the portal device with the remotely operating banking machine application. These may commonly include deposit transactions including envelopes, checks, cash, or other items. These may also include dispensing transactions involving items such as tickets, vouchers or other items. Transactions may also include account balances, inquiries or other queries. Further, it should be understood that transactions through wireless interface devices may also be carried out responsive to operation of the remote banking machine application. This may include, for example, transactions such as those carried out through features like those described in the incorporated disclosure in which a user is enabled to provide card data and/or other user identifying data through wireless communication via RF, IR or otherwise from a mobile device such as a mobile phone. Of course these transactions are exemplary of many different types of transactions that might be conducted in this manner.

Further in exemplary embodiments activities by servicers are also carried out responsive to device communications through the portal device with the remotely operating banking machine application. As can be appreciated, the banking machine application of an exemplary embodiment includes certain service diagnostic routines or other functions that can be carried out by authorized servicers. This may include, for example, routines which facilitate the replenishing of receipt paper, cash or other items within the machine. It may also include service diagnostic features that can facilitate the repair or maintenance of the machine by an authorized servicer.

In an exemplary situation, a servicer who needs to perform service activity at the machine provides one or more inputs to the machine through input devices intended for operation by a servicer. This may include, for example, providing one or more inputs through an input device located inside the machine which can be accessed by a servicer after opening a lock that controls access to the interior area of the housing. Such input devices may include one or more of a keypad, keyboard, function keys, switches, touch screen, push buttons or other devices. The input devices used by servicers are operatively connected through the portal device and are received by the remotely operating banking machine application. The banking machine application operates in accordance with its programming to cause the consumer display (assuming that there is a separate consumer display and servicer display) to provide a visual output to indicate that the machine is out of service. The application also sends device communication messages that are operative to cause the servicer display to display the service options that the servicer may wish to select in performing service activities. The servicer then provides inputs through input devices to indicate selections associated with the service activities to be conducted. These inputs are passed as device communications through the portal device to the application on the remote server and responsive communications are returned to devices of the machine through the portal device. Such servicer inputs may cause the servicer display to output data about selected devices, which input data is passed from the input device through the portal device to the remote computer, and the remote computer passes the data to output on the servicer display through the portal device. Alternatively, inputs through servicer input devices may be operative to cause devices to operate. The inputs are passed through the portal device to the remote computer, which communicates messages through the portal device to cause device operation. Numerous different service functions and tests of devices in the machine may be carried out in this manner.

In some exemplary embodiments, accessing machine service functions may include requiring the validation of a USB token or other programmable token device as associated with an authorized servicer. In such circumstances, the machine may include one or more interfaces such as an electric, wireless or other type communications port which is operatively connected to the portal device to which the authorization token may be connected. Such authorization information may be obtained from the token as connected to the interface and passed through the portal device to the remotely operating application. The application may then prompt a servicer to provide a PIN number or other identifying input so as to validate the user as authorized to place the machine in service mode or to perform other activities. Again this is passed through the portal device to the servicer display or other output device on the machine. The user then provides the inputs which are passed to the portal device and to the remotely operating application which then operates in accordance with the predetermined programmed instructions determine if the token data and identifying data correspond to an authorized servicer and to either authorize or not authorize further activities.

If such activities are authorized, the application then provides the communications through the portal device to prompt a servicer to provide selections and receives the responsive selections to the input data passed through the portal device. Further, if the user who is conducting service activities so as to operate devices, receives status information about devices, changes configuration parameters or conducts other activities with regard to the automated banking machine, such instructions are passed through the portal device to the remote computer and the remote computer then sends the messages which are appropriate to operate devices, allow operative connection of devices to the portal device for operation within the machine or to do other activities as requested by the servicer. Such devices may include the card reader, cash dispenser, keypad, EPP, receipt printer and other devices in the banking machine.

Further, in some example embodiments, the security associated with the machine may include making sure that no messages can be passed through the portal device without authentication that may involve establishing secure credentials and communications for assuring that the device is authorized and has not been connected to the machine to carry out criminal activities. Such communications may involve authentication of the credential of the servicer as well as authentication of credentials and other data, certificates, keys or other values associated with a particular device that a servicer connects to the portal device within the housing of the automated banking machine. Such credentials may be exchanged through the portal device with the remotely operating application so as to establish methods for authenticating communications with the particular device. Of course, these approaches are exemplary and numerous other service and maintenance activities may be carried out through communications from servicer operated devices at the banking machine and the remotely operating banking machine application through the portal device.

Also, it should be understood that in other example embodiments, the portal device at the banking machine and the host card interface device, hypervisor, and/or virtual machines on the remote server may be adapted to use other types of remote client protocols to communicate device bus communications and device and display communications across a TCP/IP network. Other examples of remote client protocols that may be adapted to carry out at least some of the features described herein include remote graphics software (RGS), remote desktop protocol (RDP), and Citrix Systems' Independent Computing Architecture (ICA). Further, while a TCP/IP network protocol is used in the example embodiments, other types of network protocols may also be used in other embodiments.

Figure 3:
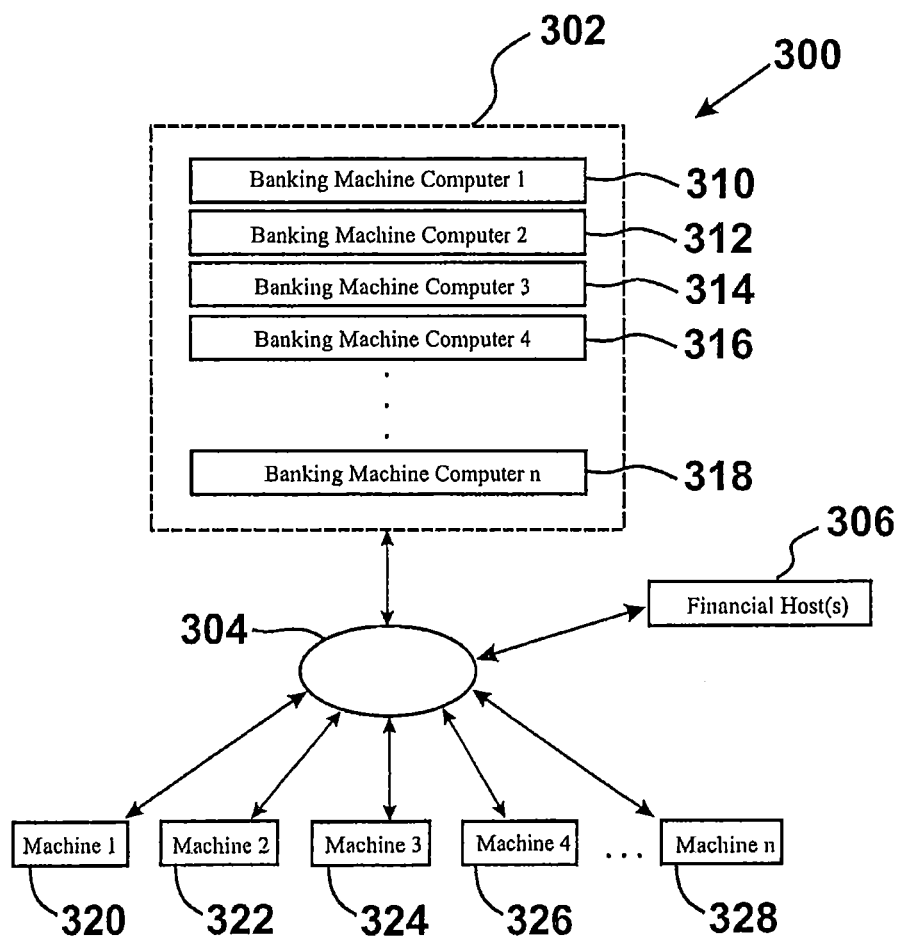
FIG. 3 is a schematic view illustrating respective automated banking machine computers in a rack remote from each respective automated banking machine.

In these described example embodiments, because the banking machine software controlling the devices in an automated banking machine is operating in a processor that is remote from the banking machine (i.e., the banking machine housing and associated devices thereon), processors for causing the operation of many banking machines may be aggregated in a common location that is remote from the respective banking machines. As illustrated in FIG. 3 this aggregation may be carried out using dedicated remote computers (having host device interface cards) in which there is a one-to-one correspondence between a remote banking machine computer (located in a remote rack in a secure facility) and a respective banking machine (located at a bank, store, or other public area). In addition, as illustrated in FIG. 4 this aggregation may be carried out using banking machine processors in the form of virtual machines (at least one for each banking machine) running on a hypervisor of one or more remote servers.

For example, FIG. 3 illiterates an example system 300 in which the previously described remote server corresponds to one of a plurality of remote banking machine computers 310-318 in the form of workstations or blade computers or other form factors for grouping large numbers of computers in a computer rack 302 or other mounting structure in a secure room or facility. Here each respective remote banking machine computer 310-318 is operative to control a respective 320-328 (i.e., the banking machine housing, portal device, and associated devices), connected to the remote banking machine computers via one or more networks 304. Such remote banking machine computers 310-318 may also be connected via one or more networks to one or more financial host systems 306 that are operative to authorize transactions or other actions or functions that can be carried out at the banking machines. In this example system, each remote banking machine computer may include one or more processors that execute computer executable instructions that comprise an operating system, banking machine software applications with computer executable instructions that control the functions carried out by the banking machine, and any applicable device drivers which include computer executable instructions necessary to cause the banking machine devices at a respective banking machine to communicate messages with the banking machine application and operate to carry out banking transactions. Also in this example system, each remote banking machine computer 310-318 may include an associated host interface card that operates to process messages and communicate in a remote client protocol with each respective portal device in each respective banking machine 320-328. However, it is to be understood that in alternative example embodiments, the remote banking machine computers 310-318 may not have associated host interface cards, but may include agent software including computer executable instructions capable of carrying out the same functions as the described host interface cards. Similarly, in alternative embodiments, the banking machines 320-328 may not include portal devices, but may include client software including computer executable instructions operating in a processor of a local computer at the banking machine which carries out the same functions as the described portal device.

Figure 4:
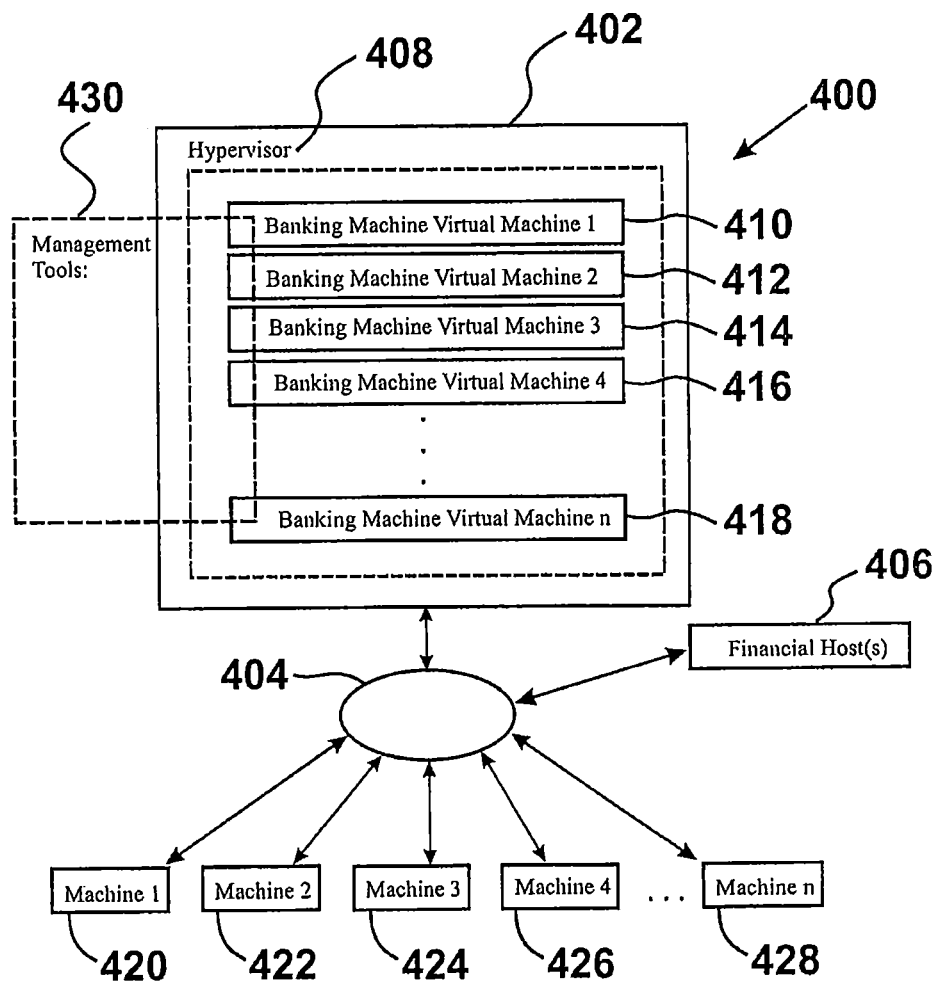
FIG. 4 is a schematic view illustrating respective automated banking machine computers as respective virtual machines in a server that is remote from each respective automated banking machine.

As shown in FIG. 4, another example system 400 may include a remote server 402 with a hypervisor 408 (i.e., native or hosted virtualization software) that operates a plurality of guest virtual machines 410-418 (having respective operating systems and respective software components such as banking machine applications and banking machine device drivers). Here each respective banking machine virtual machine 410-418 is operative to control a respective banking machine 420-428 (i.e., the housing, portal device, and associated devices), connected to the banking machine virtual machines via one or more networks 404. Such banking machine virtual machines 410-418 may also be connected via one or more networks to one or more financial hosts 406 operative to authorize transactions carried out at the banking machines.

In this described example system 400, the banking machines 420-428 may each include portal devices (or processors running client software that carries out a remote client protocol). In addition, the virtual machines 410-218 and/or the hypervisor 408 may include agent software components capable of carrying out a remote client protocol with the portal devices (or similarly functioning client software) in a manner similar to that previously described in connection with host interface card devices. As a result, each virtual machine may have an operating system and/or software applications that communicate with the USB devices and control the display in its respective banking machine using device drivers installed in the guest operating system of the respective virtual machine.

In an example of system 400, the remoter server 402 may use a native hypervisor 408 such as VMware ESX(i) to host the banking machine virtual machines 410-418. Such a hypervisor may be adapted to use of a PCoIP protocol (or other remote client protocol) to enable remote USB support and display support to the banking machine virtual machines. However it is to be understood that in alternative embodiments other hypervisor software may be used such as Zen or Microsoft's Hyper-V which may be adapted to use a remote client protocol capable of communicating USB device communications.

Figure 5:
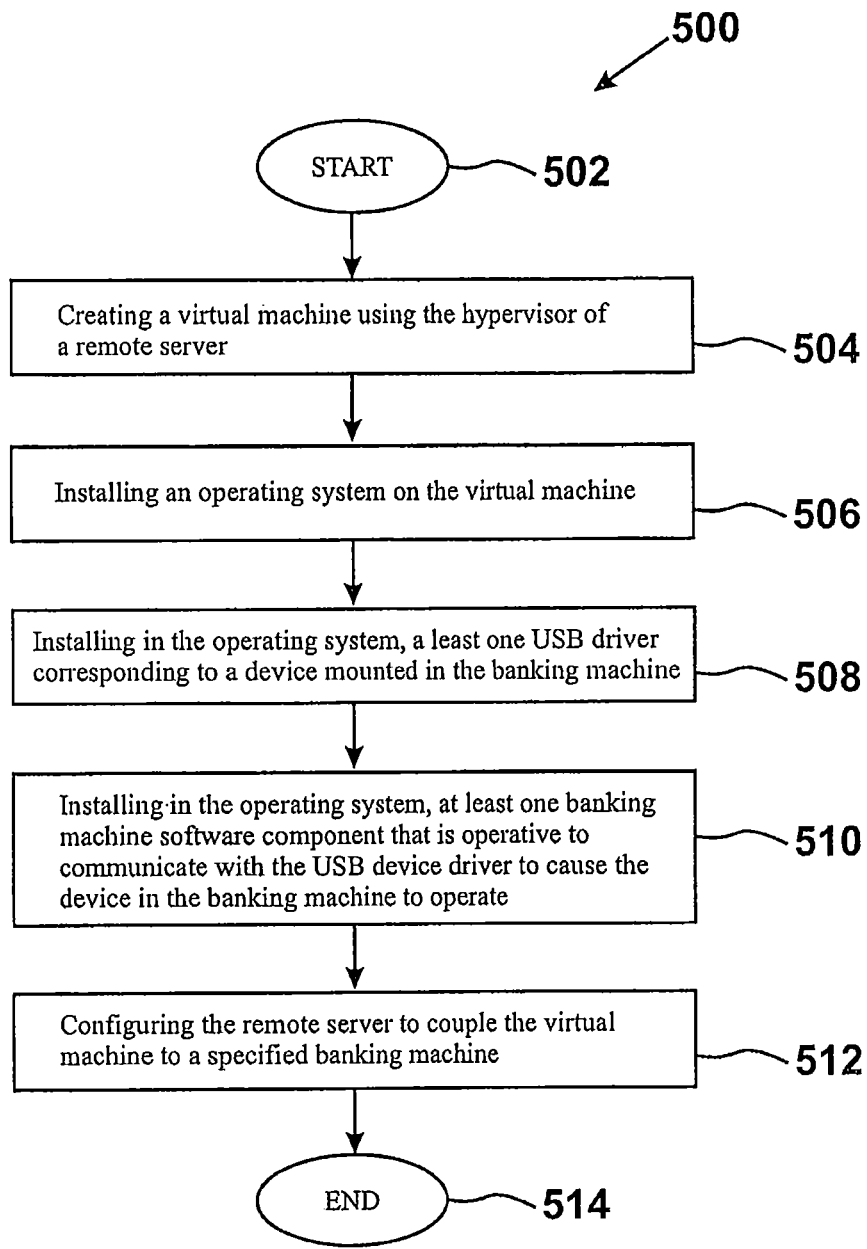
FIG. 5 illustrates an example method of provisioning a virtual machine usable to operate an automated banking machine.

FIG. 5 illustrates an example method 500 of generating or provisioning a virtual machine that is usable to operate a banking machine having a portal device. This example method may start at 502 and include a step 504 of creating a virtual machine using the hypervisor of the remote server. Such a virtual machine may be created from a previously stored virtual machine that already includes an operating system and a banking machine software stack having software applications, devices drivers and services usable to operate a banking machine. However, such a virtual machine may also correspond to an empty newly created virtual machine. In such a case, the method may include a step 506 of installing an operating system (e.g., Windows XP, Windows 7, OS/2, Linux) on a selected type of virtual computer hardware (e.g., i386 or other compatible platform) for the virtual machine. Also, the method may include a step 508 of installing in the operating system of the virtual machine, at least one USB driver corresponding to at least one device mounted in the banking machine. In addition, the method may include a step 510 of installing in the operating system on the virtual machine, at least one banking machine application software component that is operative to communicate with the device driver to cause the device in the banking machine to operate.

In example embodiments, such a banking machine application software component may correspond to an application that is operative to directly access the USB device driver. However, in alternative embodiments, the installed banking machine application software components on the virtual machine may include a high level application that uses middleware such as WOSA/XFS (Windows Open Services Architecture/eXtensions for Financial Services), and/or other middleware software to communicate with the USB driver. Examples of banking machine software architectures that use WOSA/XFS and related middleware is shown in U.S. patent application Ser. No. 11/505,612 filed Aug. 17, 2006, which is hereby incorporated herein by reference in its entirety.

In addition, in order to have the banking machine communicate with the created virtual machine, the method may include a step 512 of configuring the remote server (through software in the hypervisor and/or a network configuration) to couple the specified virtual machine to a specified banking machine (and the portal device or local computer with software that performs the function of the portal device in the banking machine). This described method may then end at 514.

In example embodiments, coupling the virtual machine to the banking machine may include configuring the programmable parameters, remote server and/or associated networking components (e.g., router, VPN, gateway, firewall) to communicate network communications associated with a specified banking machine and a specified virtual machine between each other. Further, coupling the specified banking machine and a specified virtual machine may include configuring parameters of the virtual machine and/or hypervisor to have the necessary encryption keys to encrypt and decrypt PcoIP protocol communications associated with the portal device (or local computer) that the virtual machine is to be coupled with. Also, it is to be understood, that the portal device (or local computer) at the banking machine and any associated network components will also be configured in a corresponding manner to couple the portal device to the virtual machine.

For example systems such as that shown in FIG. 3 in which actual remote banking machine computers are used to operate devices in the banking machines (and not virtual machines), a corresponding method may be carried out to install the necessary operating system, banking machine application software components, and device drivers needed to control a banking machine. Also, in such systems, the respective host interface card devices may be configured with the necessary parameters to couple the host interface card device to a specified portal device.

In example embodiments, the operating system installed in the virtual machines and/or on the banking machine remote computers may have support for USB drivers. However, the described systems may also be adapted for use with legacy operating systems that may not have support for USB drivers (e.g., OS/2). Such legacy operating system (and other installed banking machine application software) may include support for other types of legacy communication buses (e.g., RS-485, Diebold Express Bus). In order to facilitate using such legacy operating systems, conversion software may be installed in the operative communication with legacy operating systems which creates a virtual legacy bus port to which the legacy operating system and legacy banking machine software may communicate with to control a device in a banking machine which operates in response to such communications. Such conversion software may accept such legacy communications (e.g., RS-485 data) from a legacy banking machine software application, and convert it into corresponding USB communications which are capable of being communicated by the hypervisor to a specified banking machine using the PCoIP protocol or other remote client protocol. The conversion software may also receive USB communications via PCoIP or other remote client protocol and be operative to extract the legacy communications (e.g., RS-485 data) therein for communication with the legacy banking machine software application. Also, as discussed below in more detail and shown in FIG. 2, the portal device at the banking machine may include hardware-based communication modules 90 operative to convert USB communications (received/sent via PCoIP or other remote client protocol) for use with legacy non-USB devices 92 mounted in the banking machine.

Referring back to FIG. 4, the system 400 illustrating the use of virtual machines may also include management software tools 430 operating in the remote server 402 (e.g., hypervisor and/or virtual machines) and/or operating in other servers connected to the remote server. Such management tools may include software components that are operative to switch respective virtual machines of a banking machine to another virtual machine.

For example the management software includes computer executable instructions operative to detect when a banking machine virtual machine is frozen, stopped or is otherwise not operating properly, and responsive to detection of such a condition, switch the banking machine to begin operating responsive to another virtual machine that is operating properly. In another example, when it is time to upgrade the software for a banking machine, an offline virtual machine (i.e., a virtual machine that is operative but not currently operatively connected to a banking machine) may be configured, upgraded, or otherwise modified with different banking machine software components and/or settings compared to an on-line banking machine virtual machine that is currently operatively connected to the banking machine. When the off-line virtual machine is properly configured, the management tools may be used to switch the banking machine to begin using the newly configured virtual machine, and thereby achieve an upgrade of the software for the banking machine with minimal interruption of service at the banking machine.

To facilitate minimal interruption of service at a banking machine when there is a switch of virtual machines, the computer executable instructions which comprise the management tools may be operative to retrieve and copy operational data from the on-line virtual machine to the off-line virtual machine. The operational data may include log files, data bases, windows registry information, device status information, screen data, cash management information, user account information, current program operating states, or any other information that can be used by the off-line virtual machine to place itself in a substantially equivalent state of operation as the on-line virtual machine that is currently operating the banking machine.

In some cases the architecture of the banking machine software for operation of the new virtual machine may not be able to properly and reliably access devices by copying run-time operational information (such as device statuses) from the original virtual machine. Rather, such architectures may require the new virtual machine to boot up while being operatively connected to the devices in the banking machine. In such cases the management tools may be operative to cause the on-line virtual machine to place itself in an out-of-service condition (which may cause the banking machine to display an out-of-service message), such that users cannot access and operate the banking machine to carry out transactions. The management tools may then copy any relevant operational data from the original out-of-service virtual machine to the off-line virtual machine. Subsequently, the management tools may then operate to switch the virtual machines in order to connect the previously off-line virtual machine to the portal device or computer in the banking machine. The management tools may then cause the new virtual machine operatively connected to the portal device to boot-up. During the boot-up process, the new virtual machine may boot its operating system, execute software that interrogates one or more of the devices in the banking machine (e.g., the card reader, EPP, printers, cash dispenser, interfaces, etc.), execute appropriate software applications and services, and carry out any other functions needed to place the banking machine in an in-service operational state capable of enabling the banking machine to carry out banking transactions.

In another embodiment, the banking machine software operating in the virtual machine may be adapted to facilitate switching from one virtual machine to another without the need (or at least with minimal need) to copy data from the old virtual machine to the new virtual machine. For example, the banking machine software may store log files, keys, certificates, registry information, run-time information, screen state information, setup information, configuration information, and/or any other type of data related to the operation of the banking machine software and banking machine devices in a data store operating in another virtual machine and/or server which is operative but not controlling the devices of the banking machine. Thus when the existing virtual machine is replaced with a new virtual machine (for operating a particular banking machine), information needed to operate the banking machine may be accessed by the new virtual machine from the data store.

In addition, it should be noted that in the system 300, shown in FIG. 3, management tools may also be used which have capabilities similar to those of the described management tools 430. For example, corresponding management tools may be used in the system 300 in order to switch a banking machine (and its associated portal device) from using one remote computer to another remote computer.

In addition, management tools 430 may have capabilities for automatically managing the operation of a plurality of banking machines. For example, the management tools may be operative to automatically determine when one or more servers operating virtual machines for banking machines, experience heavy processing loads. Heavy processing loads for example may correspond to when relatively large amounts of memory and CPU resources of the server(s) are being used by the virtual machines operating banking machines. Such heavy processing loads may occur during times of the day when banking machine utilization is high and/or during holidays when access to banking functions is limited to use of a banking machine rather than a teller in a bank.

When such heavy processing loads are detected (and/or are predicted based on historical trends for a given day and/or time of day) the management tools may be operative to switch banking machines from using virtual machines that consume a lot of processing resources, to virtual machines that consume relatively less processing resources. Also, when low processing loads are detected (and/or are predicted based on historical trends) the management tools may be operative to switch banking machines from using virtual machines that consume relatively less processing resources to virtual machines that consume relatively more processing resources.

For example, one type of virtual machine may be configured with a software stack that causes a corresponding banking machine to output video and/or animation through its associated display. Also, a second type of virtual machine may be configured with a software stack that does not output video, but instead outputs static user interface pages on the display that contain text and/or static images. Further, a third type of virtual machine may be configured with a software stack that outputs neither video nor images, but instead causes a display of a banking machine to output monochrome (or limited color) text and/or simple graphics such as boxes and lines.

As should be appreciated, these described first, second, and third types of virtual machines require processing resources that respectively range from high to low. Based on processing loads detected (or predicted) for one or more servers, banking machines may be switched automatically based on sensed activity levels and programmed parameters and/or manually (by the management tools) to use virtual machines configured with software stacks that provide a balance between excessive utilization and under utilization of processing resources on the server. In general, the management software may be configured to try to maximize the use of virtual machines which produce more graphically pleasing display outputs such as with video and images, without causing the one or more servers operating the virtual machines to bog down and thereby cause the user interface experience at the banking machines to become unacceptably slow.

In example embodiments, when the described portal device initial boots up (and as a connection to a remote virtual machine is being negotiated), a processor in the portal device may be configured (with appropriate software/firmware) that causes the display of the banking machine to show information such as a logo and/or other information which conveys to a user that the banking machine is in an out-of-service condition, and/or is in the processes of going into an in-service condition (e.g., with a message such as "Temporarily out of Service," or "Please Wait! Service will be restored momentarily"). The processor operating the portal device, may also be operatively configured to detect when a network connection to a virtual machine has been lost. Based on such a detection, the processor operating the portal device may cause the display to display a corresponding screen conveying an out-of-service condition (such as "Temporarily out of Service").

In addition upon the detection of a lost network connection to a virtual machine, the processor of the portal device may be operatively configured to send messages to the devices (through the USB communications) which notifies the devices that the banking machine is no longer being controlled via a virtual machine. In example embodiments, the devices in the banking machine may be adapted to carry out further processing responsive to such a notification in order to handle an ongoing user transaction in a manner which minimizes problems for a user using the banking machine. Such a notification for example may correspond to a USB communication that conveys that the USB device is being unplugged or another type of USB message which can trigger the device to operate in accordance with stored computer executable instructions stored in a data store of the device to carry out an appropriate action through operation of at least one processor of the device when communication to the virtual machine is lost.

For example, if a user is carrying out a deposit of checks or cash, the connection to the virtual machine may have been lost prior to the virtual machine instructing the depository mechanism to finally accept the deposit. In such situations, the depositary mechanism may be responsive to the notification from the portal device (issued as a result of the lost network connection with the virtual machine) to transport the deposit back to an opening though which the user can take back the deposit.

Similarly, the card reader may be responsive to such a notification from the portal device to return the user's card back to the user. Also, if a cash withdrawal is underway and has been previously authorized prior to the lost network connection, the cash dispenser may be responsive to such a notification to complete the transaction and present the cash to the user. In these described circumstances, the portal device may be operative to cause the display to output a message indicating that the banking machine is going out of service and that the user should take his/her deposit, card, and dispensed cash prior to leaving the machine.

In example embodiments, the described portal devices may be configured to automatically disconnect from a remote virtual machine (or remote banking machine computer) when the machine is not being used by a user. When in a disconnected mode, the portal device may operate in an attract mode by displaying through the display a message that prompts a user to insert or swipe a card in a card reader of the banking machine (such as: "Please insert card into card reader"). The card reader device may be adapted to be responsive to the detection of an inserted or swiped card to communicate a USB device message representative of the detection of a user card. In this described embodiment, the portal device may be operatively configured responsive to this communication to connect (or reconnect) via the network to a remote virtual machine. Once the connection has been established, the portal device may be operative to send a USB communication to the virtual machine that corresponds to the USB communication received from the card reader regarding the detection of a user card. Thereafter, the software operating in the virtual machine may operate the card reader, display, and other devices to enable the user to carry out a transaction with the machine.

Figure 7:
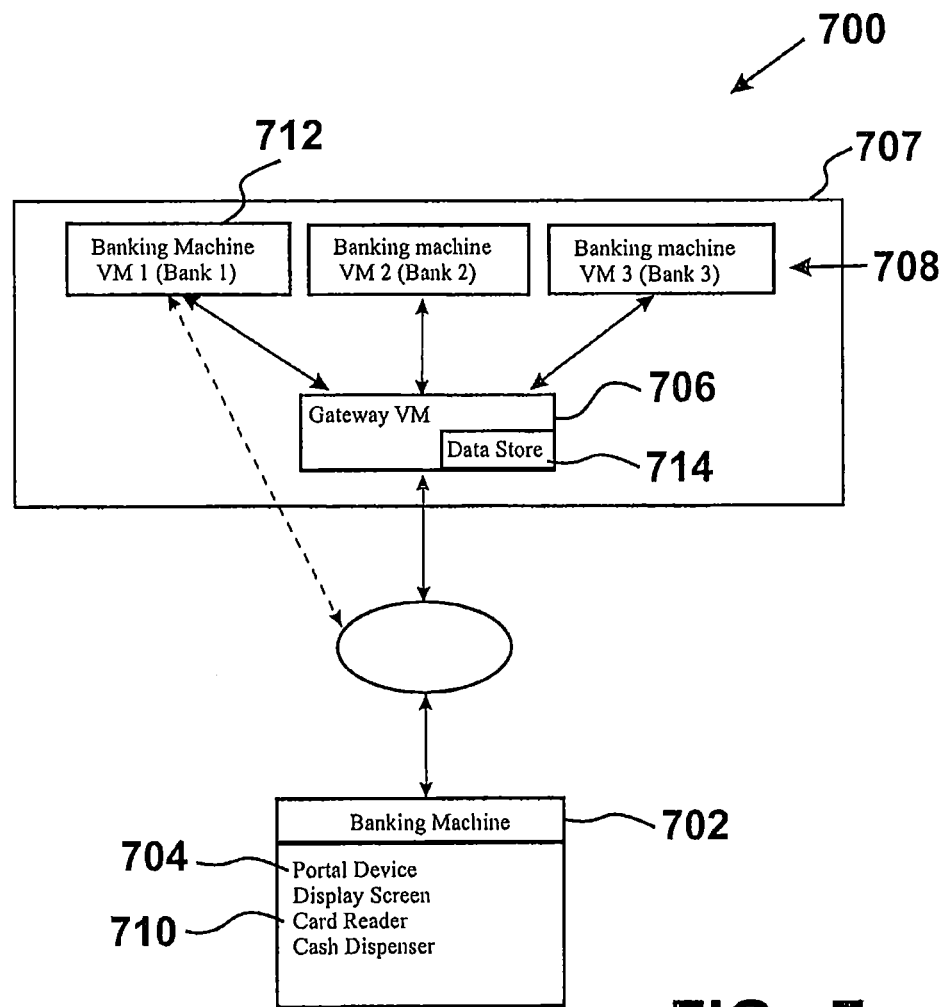
FIG. 7 is a schematic view illustrating a system that includes a gateway virtual machine.

In example embodiments, the banking machine hardware may be operated by a virtual machine controlled by the specific financial institution (e.g., a bank) that owns the banking machine hardware. However, in alternative embodiments, the described banking machine hardware may be operated by virtual machines from different financial instructions depending on which financial institution issued the card being used by the user at the banking machine. For example as shown in FIG. 7, an alternative example system 700 may include banking machine 702 having a portal device 704 that is operatively configured to communicate with a remote virtual machine 706 operating in a remote server 707. Virtual machine 706 corresponds to an initial gateway that transfers control of the banking machine to one of a plurality of other virtual machines 708 for different financial institutions based on card data read from the user's card.

In this described embodiment, the gateway virtual machine 706 is operatively configured to receive USB communications from the portal device 704 that were originally communicated by the card reader 710 of the banking machine 702. Such USB communications for example may include a primary account number (PAN) which includes bank identification number (BIN) or other financial institution identifying data which was read from a card of the user by the card reader 710 of the banking machine. The gateway virtual machine 706 may be responsive to the financial institution identifying data to transfer control of the banking machine 702 to another virtual machine 712 that has been previously designated (i.e., provisioned) as a virtual machine that should take control of the banking machine for the particular financial institution identifying data read from the card of the user.

In this described system, each of the other virtual machines 708 may have a software stack developed and certified to operate the type of banking machine (and its associated hardware) to which it will be transferred control thereof via the gateway virtual machine 706. Also, because, each financial institution may have a different software stack for operating the banking machine 702, the banking machine will take on a personality (i.e., user interface experience) that is different and specific to each financial institution. For example, each of the financial institution virtual machines 708 may include software stacks that display different logos, graphics, text, video, and menus. Further different financial institution virtual machines 708 may carry out different transaction with the banking machine 702. For example some of the virtual machines 708 may allow the user to carry out one type of transaction (such as the payment of bills), whereas other ones of the virtual machines 708 may not provide menus options for carrying out such transactions.

In this described example embodiment, when the other virtual machines 708 have completed their transactions with a user, they may be adapted to transfer control of the banking machine back to the gateway virtual machine 706. The gateway virtual machine may be operative to cause the banking machine to place itself in an attract mode which prompts users to insert or swipe their cards to begin operating the banking machine.

In addition, although user cards (such as credit cards, debit cards, ID cards, etc.) have been described as being used to initiate activity with a banking machine, it should be appreciated that alternative embodiments may use other forms of devices (e.g., tokens, mobile phones) and/or biometric inputs (e.g., finger print scans) to provide information that identifies the user and/or the desired financial institution or other account associated with the user (e.g., an account number and/or financial institution identifying data).

In system 700, the gateway virtual machine 706 may be configured to store in at least one local or remote data store 714, data representative of the transfers of communications from a respective automated banking machine to the other virtual machines 708. The gateway virtual machine may also be operative to monitor the other virtual machine 708 to which it has transferred control of the banking machine, to ensure that it is operating properly. For example, the gateway virtual machine may be operative to periodically poll another virtual machine 712 to verify that it is still actively operating a transferred banking machine. If the other virtual machine 712 is unable to respond, the gateway virtual machine may retake control of the banking machine. When retaking control of the banking machine in this manner, the gateway virtual machine may be operative to poll the statuses of the devices in the banking machine and cause the devices to carry out further actions (such as returning or retaining a card of a user) based on the information provided by the devices, in order to return the banking machine to a normal operating mode (e.g., such as an attract mode).

In example embodiments of the system 700, the data stored in the data store 714 may be used by the system to calculate the amount of time and/or number of transactions that different financial institutions have used the banking machine 702. Such information may be used by other billing systems to assess charges to the financial institutions based on the amount of usage of the banking machine. Examples of systems that are operative to assess fees for applications used to control a banking machine are shown in U.S. Application No. 7,725,393 issued May 5, 2010 which is hereby incorporated herein by reference in its entirety.

In certain previously described example embodiments, the banking machine includes a processor and software that serve as a thin client that relies on a remote virtual machine (or remote banking machine computer) to carry out the processing needed to carry out financial transactions, operate device drivers for controlling banking machine hardware, and operate banking machine software applications to provide an interactive user interface for operating the machine. However, it is to be understood that the banking machine software needed to operate the machine devices, may be located on not just a connected virtual machine or remote banking machine computer, but may be distributed across addition servers or virtual machines on the same remote server or other remote servers. Examples of such architectures that may be integrated into the described example embodiments include the systems shown in the following U.S. patents which are hereby incorporated herein by reference in their entirety: U.S. Pat. No. 7,624,050 of Nov. 24, 2009; U.S. Pat. No. 7,606,767 of Oct. 20, 2009; and U.S. Pat. No. 7,555,461 of Jun. 30, 2009.

The example embodiments described herein may include banking machines that are manufactured to include the described portal device therein. However, it should be understood that in alternative example embodiments, the described systems may include existing banking machines that are upgraded to operate using the described portal device and remote server (via virtual machines, or dedicated remote banking machine computers in a rack). Thus, an example embodiment may include a method of upgrading existing banking machines to correspond to the banking machines described herein.

Figure 6:
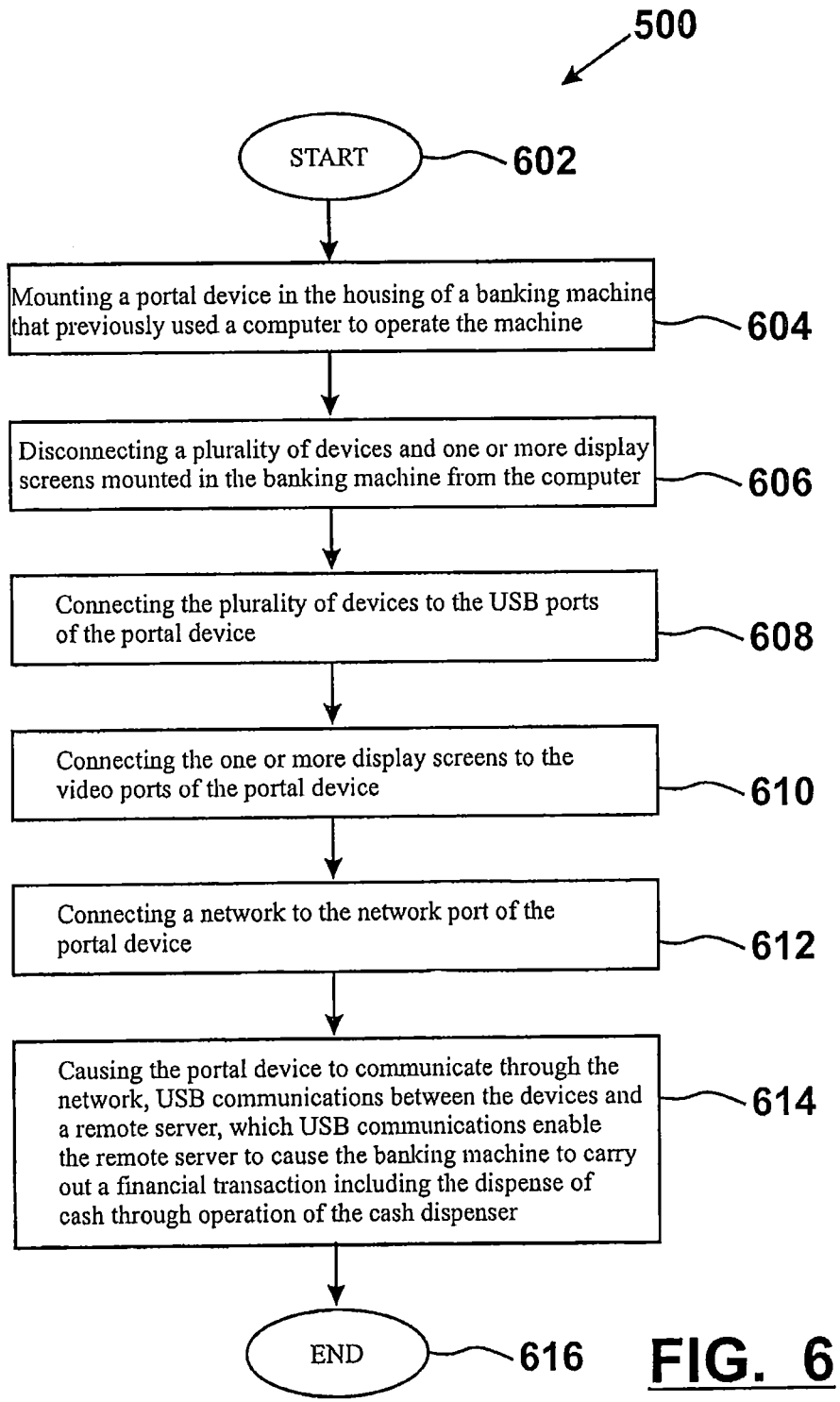
FIG. 6 illustrates an example method of upgrading an existing automated banking machine to operate responsive to a virtual machine or a remote computer.

FIG. 6 illustrates an example embodiment of such a method 600. This method may begin at 602, and may include a step 604 of mounting a portal device in the housing of a banking machine that previously used a computer to operate the banking machine. Such an existing banking machine may already include a housing that has one or more displays and a plurality of devices including a card reader, a cash dispenser, at EPP/keypad, touch screen, receipt printer, wireless interface circuitry and other devices in operative connection with the computer within the housing. In order to install the portal device, the method may include a step 606 of disconnecting the plurality of devices and one or more displays from the computer within the housing. Also, at step 608, the method may include connecting the plurality of devices to the USB ports of the portal device. In addition the method may include a step 610 of connecting the one or more displays to the display ports of the portal device. Further the method may include a step 612 of connecting a network to the network port of the portal device.

Once the existing components of the banking machine have been connected to the portal device, the method may include a step 614 of causing the portal device to communicate through the network, USB communications between the devices and a remote server. As discussed previously, such USB communications enable the remote server to cause the banking machine to carry out a financial transaction such as the dispense of cash through operation of the cash dispenser. The method may then end at 616

Also, it is to be understood that this described method may include additional steps to upgrade the banking machine. For example, the method may include a step of removing the original computer from within the housing of the automated banking machine. Alternatively, the described portal device may then be mounted in the same general location previously occupied by the computer. The portal device may also be mounted in a different location than the original computer. Such locations may include a position inside or outside the chest of the banking machine or other location in the housing of the banking machine.

For example, in a further example embodiment, the portal device may be mounted inside a chest of the banking machine. USB cables, network cables, and video cables, that were previously connected to a computer outside the chest may then be routed through one or more holes through the chest, so as to be connected to the portal device. If needed, this embodiment, may include drilling new holes through the safe to accommodate the routing of the cables. Also, if needed, this embodiment may include replacing or lengthening (via extensions) cables so as to have a sufficient length to reach the portal device mounted in the chest.

Figure 12:
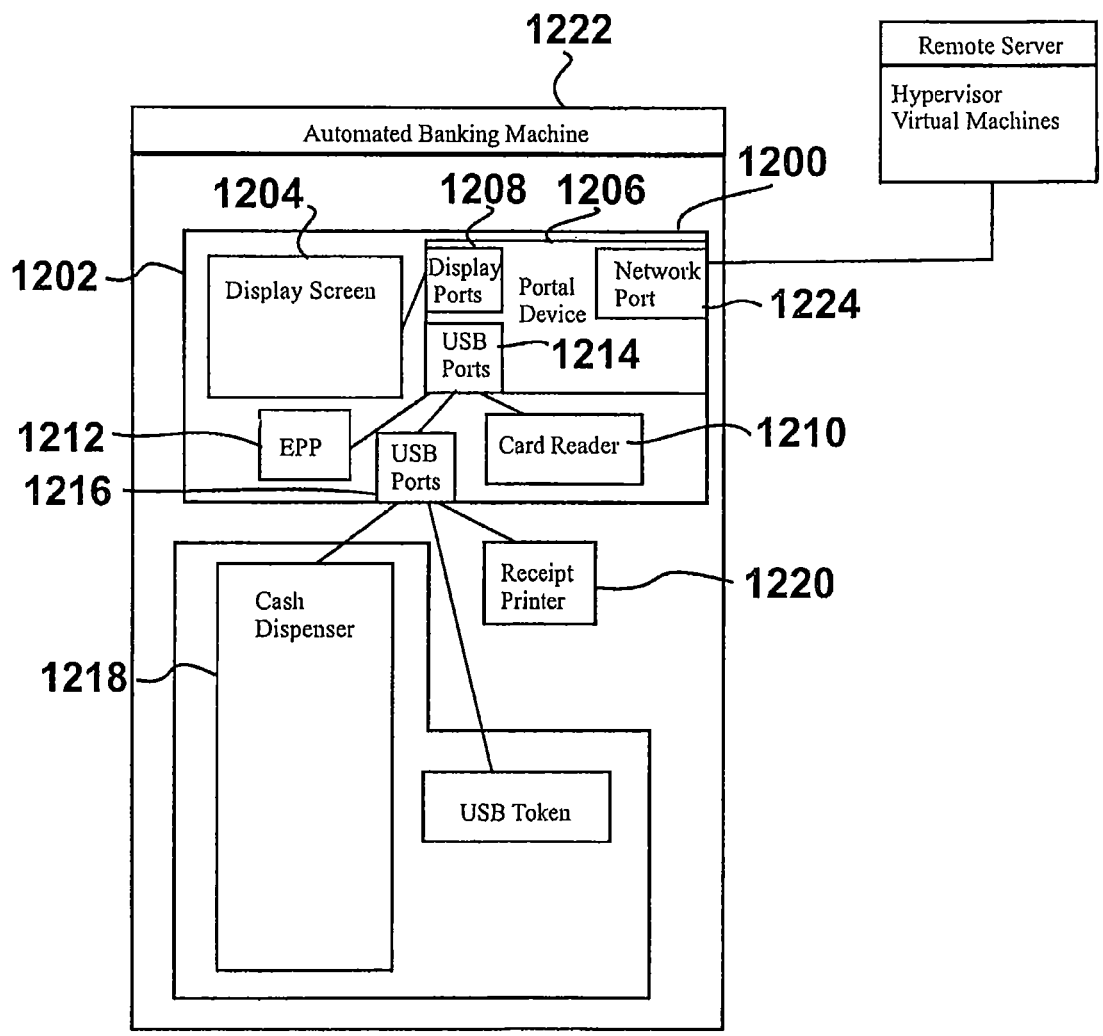
FIG. 12 is a schematic view illustrating an example display mounted in an automated banking machine.

In a further embodiment, an existing display of a banking machine may be replaced with a display module that includes both a display and the described portal device. FIG. 12 illustrates an example of such a display module 1200 having a housing 1202 that includes both a display 1204 and a portal device 1206 integrated therein.

In this embodiment, the portal device 1206 may correspond to one or more circuit boards mounted in the housing 1202 having the electrical circuitry, ports, and chips that correspond to the described portal device 1206. Such circuit boards may include internal ports, headers, or other types of electrical connections that are connected to devices also mounted in or have functional capabilities provided by the display module. Such internal devices may include the display 1204 which is connected to an internal display port 1208 of the portal device 1206. The internal devices may also include other types of devices integrated into the housing 1202 of the display module 1200 such as a card reader 1210 and an EPP 1212 which are connected to internally positioned USB ports/headers 1214 of the portal device. In addition, the described display module may include external USB ports 1216 connected to the portal device, which enable external devices (e.g., devices located outside the display module housing) to be connected to the portal device 1206. Such external devices may include a cash dispenser 1218, receipt printer 1220 and/or other types of devices (e.g., depository, check acceptor, cash acceptor, cash recycler). In addition, (although not shown) the housing 1202 of the display module 1200 may include an external display port for use with connecting a secondary display such as a display used by a service technician that services the banking machine. Also, the portal device may include an externally located network port 1224, which enables an external network cable such as an Ethernet cable to be connected to the portal device 1206.

Although the display module 1200 shown in FIG. 12 includes a card reader and an EPP mounted in the housing 1202 of the display module. It is to be understood that other embodiments of the display module may not include a card reader or an EPP. For example, when an existing banking machine already includes an EPP and a card reader, a display module may be used to replace an existing display (and its computer) in the banking machine, in which case the display module only includes a new display and a portal device mounted in the housing of the display module. In this example, the various USB cables, display cables, and network cables may be dismounted from the computer in the banking machine. The original display may then be removed and replaced with the described display module. The disconnected USB cables (for the cash dispenser, card reader and other devices) and disconnected network cable previously connected to the computer in the banking machine may then be connected to corresponding external USB ports 1216 and external network ports 1224 of the portal device that are now integrated into the housing 1202 of the display module 1200.

It should also be appreciated that the described example display module may include other user input devices such as USB connected function keys, a USB connected single touch or multi-touch screen (which may have heptaptic vibration feedback capabilities). Also the display module may include other devices integrated therein such USB speakers, a USB video camera, a USB headphone audio input jack. As with the described integrated card reader or EPP, such additional USB devices may be integrated into the housing with their corresponding USB cables mounted to the portal device inside the display module housing 1202. Further examples of displays including one or more of these described features is found in U.S. provisional application No. 61/354,778 filed Jun. 15, 2010 which is hereby incorporated herein in its entirety.

As discussed previously, some existing banking machines may have legacy devices that are not originally designed to connect to USB ports. For example such devices may connect to a computer located in the housing of the banking machine via a Diebold Express Buss, an RS-485 connection, an RS-232 connection, and/or some other standard or proprietary legacy communication bus connection. In order to connect such non-USB banking machine devices to the USB ports of a portal device, the banking machine may include one or more communication modules 90 (shown in FIG. 2) that convert between the legacy bus communication of the legacy devices 92 to the USB communications compatible with the portal device 40. In an example embodiment, such communication modules may include a controller with appropriate firmware to carry out the conversion. Such communication modules may include a USB port capable of being connected to the USB port of the portal device. Such communications modules may also include one or more legacy ports capable of being connected to the legacy ports of the individual legacy devices in the banking machine or a common legacy bus to which the devices are connected.

As discussed previously and illustrated in FIG. 2, some banking machines may include two displays such as the consumer display 24 mounted in the front of the banking machine (as shown in FIG. 1) and a servicer display 26 mounted in the rear of the banking machine. An example embodiment may include a portal device that includes two display ports to which the consumer display and the servicer display may be connected. Also in the case of the previously described display module 1200 in FIG. 12, the display module itself may include an internally mounted display (for use by a consumer) and may also include an external display port for connecting a servicer display (used by a service technician).

In order to use both displays, the software operating on the remote banking machine computer or remote virtual machine may include an operating system (and appropriate drivers) to span a desktop of the operating system across both displays 24, 26. The banking machine software may be configured to display a user interface for users to performing banking functions on the portion of the desktop that is displayed on the consumer display 24. Also the banking machine software may be configured to display a user interface for servicing the machine (e.g., maintenance, diagnostic, configuration) banking functions on the portion of the desktop that is displayed on the servicer display 26. Examples of using dual displays in a banking machine are shown in U.S. Pat. No. 7,588,183 of September, 2009, which is hereby incorporated herein by reference in its entirety.

Also, it should be noted that the servicer display of a banking machine may be associated with additional USB input devices (such as a trackball, touch pad, keyboard) which may be connected to the USB ports of the portal device. However, with the additional input devices associated with a servicer display and the many devices in a banking machine, the total number of USB components in a banking machine may exceed the number of USB ports on the portal device. In such cases, the banking machine may include one or more USB hubs which expand the number of available USB ports that are connected to the portal device.

Typically the servicer display is used by a servicer to carry out diagnostic functions at the banking machine. In example embodiments, the servicer may use the input devices and servicer display at the banking machine to operate diagnostic and configuration software on the remote computer or virtual machine associated with the banking machine. Examples of such diagnostic software that may be implemented in a remote banking machine computer or virtual machine is shown in the previously mentioned U.S. patent application Ser. No. 11/505,612 filed Aug. 17, 2006, which is incorporated herein by reference in its entirety.

To facilitate diagnostic operations on a banking machine, an example embodiment may include access to the previously described management tools through a user interface displayed on the servicer display 26 of the banking machine. With such tools, the servicer may be operative to configure and initiate a switch of the banking machine to begin using a different virtual machine or remote computer to control the banking machine. Alternatively, the servicer may have a remote computer (e.g., laptop, tablet, smart phone) that provides the servicer with access to management tools through a web page or other type of user interface that communicates with the virtual machine, remote banking machine computer, remote server, hypervisor, or other server and/or software that is operative to facilitate carrying out diagnostics and maintenance on the banking machine.

In example embodiments that use a virtual machine, the management tools may include services that periodically take snapshots of the virtual machine which involve the capture in one or more data stores of data, instructions, qualities, status and/or properties of the banking machine. Such snapshots may include all such instructions, data, etc., or may include only selected portions thereof. The information captured by such snapshots may be compared through computer operation to the corresponding currently on-line virtual machine to detect unauthorized changes caused by viruses, worms, rootkits or other unauthorized software. Also such snapshots may serve as backups of the virtual machine in case a newly installed update to the software in the currently on-line virtual machine causes unexpected problems.

The previously described systems 300, 400 include features for executing banking machine software applications on a remote computer or virtual machine. However, aspects of the described systems may also be used on banking machines that continue to execute software on a local computer inside the housing of the banking machine. For example, in an alternative example embodiment, the local computer in a housing of the banking machine may execute a hypervisor, either natively or on a host operating system installed on the local banking machine computer. In such an embodiment, one or more virtual machines operating in the local computer of the banking machine may include the necessary software stack for controlling the devices in the banking machine and providing a user interface for controlling the machine through one or more display devices. As described previously, off-line virtual machines (corresponding to stable backups or a new virtual machine with upgraded software) may be used to replace a currently on-line virtual machine that is experiencing problems and/or is in need of upgraded software. Also, different virtual machines may operate simultaneously on the local banking machine computer which are directed to different functions. For example, one virtual machine may provide a consumer user interface that controls the banking machine devices. Another virtual machine (or the operating system that hosts the hypervisor) may include diagnostic software and tools for servicing the banking machine.

As discussed previously, example embodiments of a banking machine may include a collection of devices connected via USB cables to a portal device in the banking machine, which portal devices carry out PCoIP communication with a remote virtual machine or remote computer. However, as illustrated in FIGS. 8 and 9, in alternative example embodiments, a banking machine may include a collection of devices that are in individual network communication with one or more remote virtual machines without using a portal device.

Figure 8:
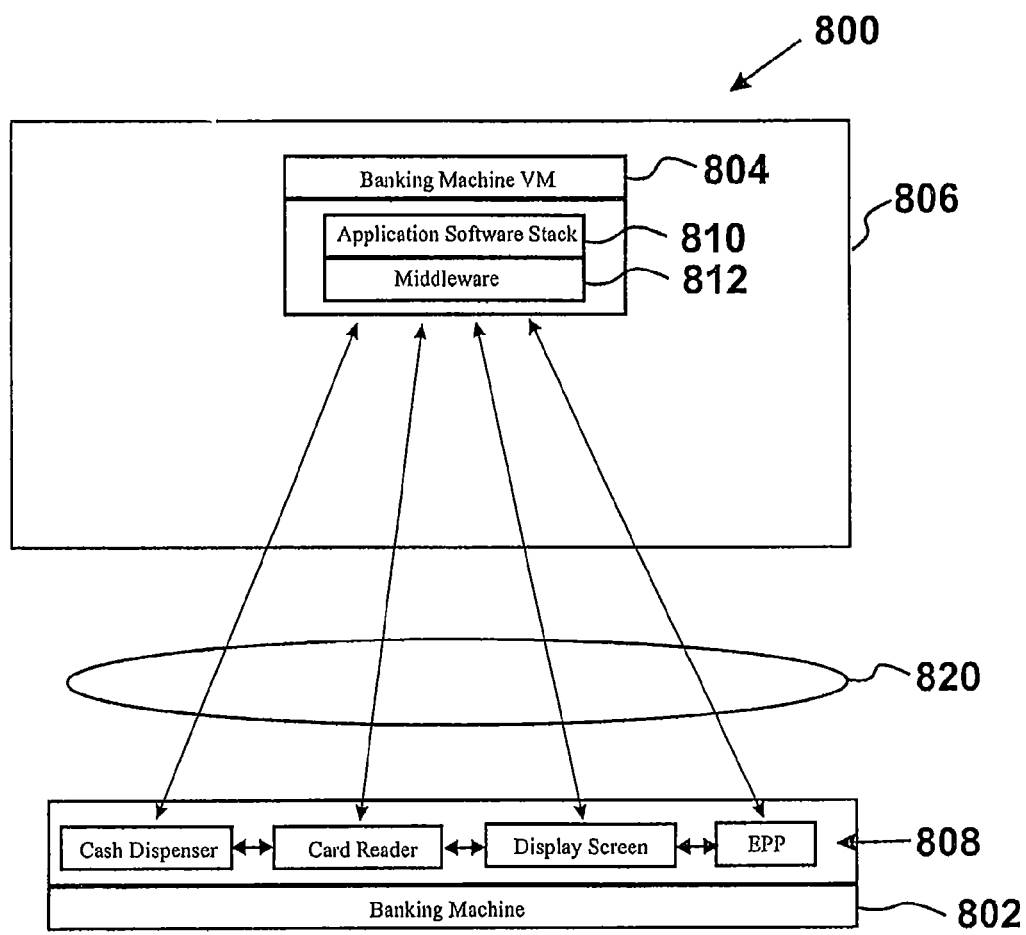
FIG. 8 is a schematic view illustrating an alternative system in which banking machine devices individually connect through a network to an automated banking machine virtual machine operating in a network.
Figure 9:
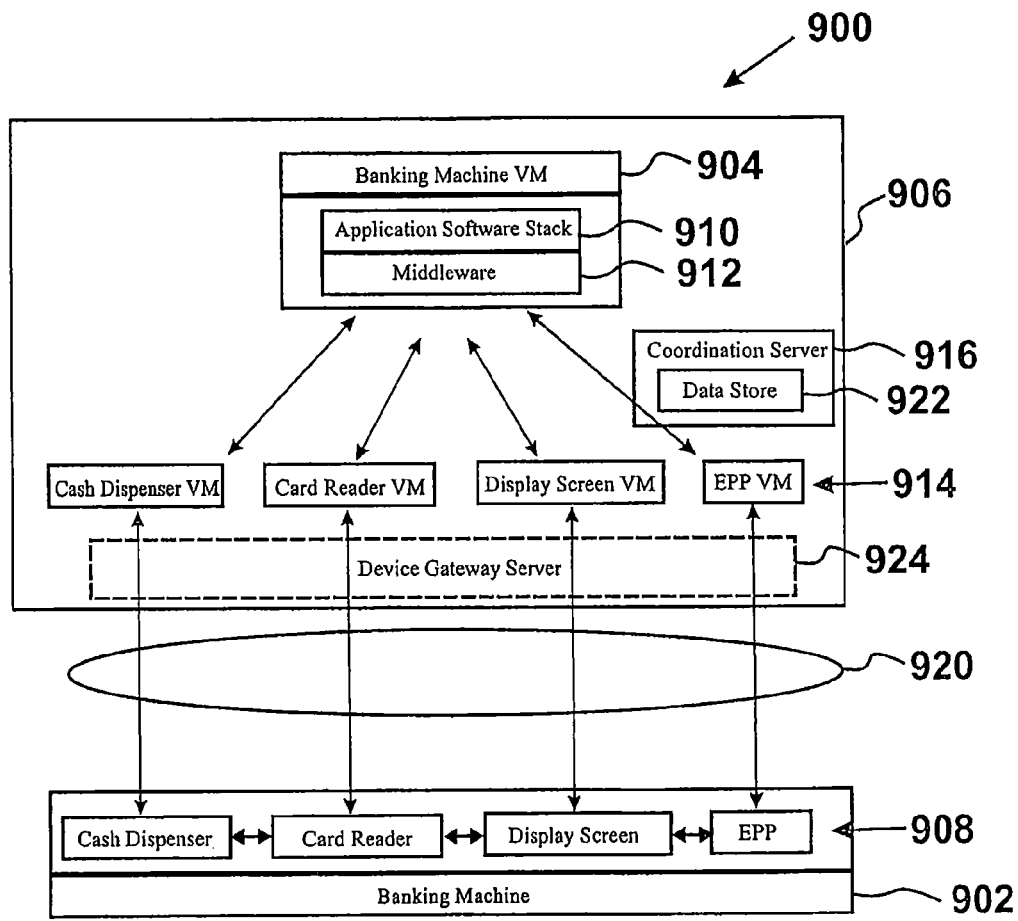
FIG. 9 is a schematic view illustrating an alternative system in which banking machine devices individually connect through a network to virtual machines operating in a network corresponding to each type of device.

For example, as shown in the system 800 illustrated in FIG. 8, a banking machine 802 may include a plurality of devices 808 (e.g., card reader, cash dispenser, display, and EPP). Such devices 808 may be adapted to include network interfaces which are individually operative to form a network connection via a TCP/IP network with the same or different banking machine virtual machines 804 operating in one or more physical servers 806 which may include many other banking machine virtual machines as well. Such physical servers may be networked together locally or connected in a network cloud arrangement such as through a private WAN or the Internet.

In this described embodiment, the software/firmware of the devices 808 and software installed on the banking machine virtual machine 804 (such as device controlling middleware 812), may be adapted to communicate device communications back and forth through a public or private network 820 between the banking machine virtual machine 804 and the respective devices. Such device communications may correspond to commands that cause the devices to carry out hardware and/or software functions. Such communications may also include messages (error messages, status messages, command messages) or any other data that may be used by application software 810 and respective devices to carry out transactions.

In an example embodiment, the banking machine software 810 (operating in the banking machine virtual machine 814) may correspond to a software stack capable of operating on a local computer in a traditional banking machine. However, in this described embodiment rather than including associated middleware (and/or device drivers) that is designed to communicate with local devices, the banking machine virtual machine may include middleware 812 that is adapted to communicate instructions from the banking machine application 810 via the network 820 to respective devices 808 in the remote banking machine 802.

To facilitate a secure connection between devices and the banking machine virtual machine, each of the devices may be configured to limit connections to the particular network addresses (i.e., an IP address) for the banking machine virtual machine to which they are authorized to communicate. Also, the banking machine virtual machine may be configured to limit device connections to the particular network addresses associated with the devices of the banking machine 802. Further, the devices and banking machine virtual machine may include digital certificates and encryption keys usable to establish trusted and secure communications therebetween.

In the example embodiment shown in FIG. 8, each of the devices 808 in the banking machine 802 is operative to communicate with a common banking machine virtual machine which controls the operation of the banking machine devices. However, as shown in FIG. 9, in an alternative system 900, a banking machine 902 may include a plurality of devices 908 (e.g., card reader, cash dispenser, display, and EPP) with network interfaces which are individually adapted to connect to different virtual machines 914 operating in one or more servers 906, which may include many other virtual machines as well. In embodiments with more than one physical server, the servers 906 may be networked together locally or connected in a network cloud arrangement such as through a private WAN or the public Internet.

In this example system 900, each device 908 may connect (via network 920) to a device specific virtual machine 914 that is limited to controlling the respective type of device. Such device specific virtual machines may be configured with software instructions dedicated to controlling a plurality of different models of a particular type of device (e.g., different models of cash dispensers). However, in further alternative embodiments, the device specific virtual machine may be dedicated to connecting to a specific model (and/or specific firmware of a model) of a type of device. Also, in example embodiments, each device specific virtual machine 914 may be operative to only connect to one device at a time. However, in alternative embodiments each device specific virtual machines 914 may simultaneously be connected to a plurality of devices (of the same type and/or same model) each located in a different banking machine.

As in the previously described system 800, the system 900 may include a virtual machine 904 that includes a software stack 910 adapted to control a banking machine 902. However, rather than including middleware software that is adapted to communicate directly with devices via network 920, the middleware 912 may be adapted to communicate (via TCP/IP network communications) with the plurality of device specific virtual machines 914 operating in one or more physical severs 906.

Here the device specific virtual machines include software with model specific device drivers for the one or more different types of models of devices for which they are adapted to control. To enable a common banking machine virtual machine 904 with a common application software stack 910 to be capable of controlling banking machines with different types and models of devices, each device specific virtual machine for each type of device, may present a common network API interface to the middleware 912 of the banking machine virtual machine 904, which API is uniform across many different models of the respective types of device.

In this described embodiment, the one or more servers 906 may include hundreds and/or thousands of banking machine virtual machines 904 and device specific virtual machines 914. In order to coordinate communications therebetween, the system 900 may include a coordination server 916 (which may operate in its own virtual machine) that is operative to provide the correct associations between the banking machine virtual machines 904, device specific virtual machines 914, devices 908, and their respective devices 908 and banking machines 902. Such a coordination server 916 may correspond to a component of the previously described management tools for managing virtual machines.

In this described embodiment, the coordination server 916 may include a management user interface (such as a web portal) capable of being used to receive inputs to remotely update the coordination server 916. Such a user interface may enable authorized users to store associations in a data store 922 associated with the coordination server 916 for the different network addresses of virtual machines and devices which correspond to individual banking machines.

For example, when a new banking machine is being provisioned, the coordination server may be updated (via associations stored in the data store 922) to include the group of network addresses of the virtual machines and devices which need to communicate with each other to carry out controlling the banking machine. In this described embodiment, the banking machine virtual machines may be adapted to securely access the coordination server 916 to determine the appropriate addresses of device specific virtual machines that correspond to the types and models of devices in the banking machine it is responsible for.

Similarly each device specific virtual machine may access the coordination server 916 to determine the device address of the device 908 in the banking machine 902 it is responsible for, as well as the address of the banking machine virtual machine 904 it should communicate with to control the device. Further, the devices 908 may be adapted to securely access the coordination server 916 to determine the appropriate device specific virtual machine to communicate with.

In this described embodiment, different devices associated with a particular banking machine may be operative to directly access different IP address for their respective virtual machines. However, in alternative embodiments, one or more of the devices for a particular machine may initially connect to a common address of a device gateway server 924 (which may operate in its own virtual machine). Such a device gateway server may be operative to determine unique information which distinguishes the different devices (e.g., MAC address, IP address, device ID, digital certificate) making the initial connection. The device gateway server may then route and/or otherwise transfer control of the device to the appropriate address of a device specific virtual machine capable of controlling the device. In such an alternative embodiment, the device gateway server may access the previously described coordination server 916 to determine the address of the device specific virtual machine based on the unique information (e.g., MAC address, IP address, device ID, digital certificate) determined about the device.

When a device initially connects to a device specific virtual machine, such a device specific virtual machine may operate to begin transferring communications from the device to a particular banking machine virtual machine associated with the device. In this described embodiment, the device specific virtual machine may be operative to access the previously described coordination server 916 to determine the address of the virtual machine (to connect to) based on the banking machine the unique information determined about the device.

In an example embodiment, the device specific virtual machines and banking machine virtual machines may be started as needed (if not already running). In such embodiments, the coordination server 916 or device gateway server 924 may be operative to execute a new running device specific virtual machine or a banking machine virtual machine as needed if such virtual machines have not already been started. For example, when a card reader initiates a communication indicating that a user is seeking to insert a card into the card reader of a banking machine, the described gateway server or coordination server may start a new device specific virtual machine for the card reader, as well as start a new banking machine virtual machine to control the card reader and the other devices in the same physical banking machine as the card reader (for example, the EPP, cash dispenser, receipt printer, etc. in that banking machine).

Further, it should be appreciated that virtual machines may be operatively configured in accordance with their programming to shut themselves down when they are no longer needed. In addition, the coordination server 916 may be operative to carry out a programmed garbage collection process in which it periodically and selectively causes executing virtual machines to close that are no longer needed. For example, the coordination server may close virtual machines responsive to a determination by the coordination server that an associated banking machine has shut down and/or is in a state that does not currently require the connection to a virtual machine at that time.

As can be appreciated via reference to FIG. 9, software upgrades can be carried out in system 900 by targeting the specific virtual machine that includes the software that needs upgraded. Thus, if a specific device driver for a specific model of cash dispenser is being upgraded, only the device specific virtual machine for that model of cash dispenser may require a new device driver. Once the new device driver is installed in a new upgraded device specific virtual machine, the coordination server 916 can be updated to direct all new connections for that type of device to the upgraded new virtual machine (and/or executing copies of that upgraded virtual machine). As a result one or more banking machine virtual machines 904 and/or one or more cash dispenser devices in one or more banking machines 902 will immediately be able to operate responsive to the upgraded device driver.

Also, if a banking machine is upgraded by the installation therein of a new model of a device (e.g., a new card reader), no new software may need to be installed on the associated banking machine virtual machine. Rather only a change to the data store 922 of the coordination server 916 may be needed to associate the new device for the banking machine to an appropriate device specific virtual machine that corresponds to the newly installed device.

In an example embodiment, the previously described management tools and/or coordination server may include management user interfaces (such as a web portal or other application) which are operatively configured to enable different users to administer different groups of banking machines via the creation, configuration and/or management of virtual machines operating on the plurality of servers 806, 906. The management tools and/or the coordination server 916 may use the data store 922 (or another data store) to store different administrative accounts and associated policies which enable the different administrative accounts to control and modify a designated subset of banking machines and their associated devices and virtual machines that are associated with each other in the data store 922.

For example, different banks may be configured to each have different administrative accounts which manage different banking machines, banking machine devices, and virtual machines. Personnel working for such banks may log into a management user interface associated with the coordination server 916 and use the interface to configure, add, and delete data associated with different banking machines (associated with their accounts) that are controlled using the coordination server 916. In this manner, such personnel can remotely provision and configure each individual banking machine or groups of banking machines and the specific virtual machines (and their associated software) that are to be used to control the operation of each respective banking machine or group of banking machines.

Also, for embodiments of banking machines that include portal devices, the system may include management user interfaces usable by personnel for banks or other organizations that manage banking machines, to carry out a provisioning process that associates a specific portal device with a specific banking machine virtual machine. Such a provisioning process may involve configuring a new portal device to be capable of connecting via a network to a particular server address associated with a banking machine virtual machine usable to operate the banking machine in which the new portal device will be mounted.

In example embodiments with portal devices, the portal device may by provisioned by updating a memory of the portal device to store therein one or more server addresses, authentication information (such as client/server certificates, a login identification, a password, a terminal identification number) and/or any other information usable to securely and automatically connect to a remote banking machine virtual machine through a network. Such a provisioning process may also include creating a new banking machine virtual machine to include an appropriate software stack, configuration, and data that is executable on a virtual computer platform capable of controlling the banking machine devices of the machine in which the portal device will be mounted.

In addition, the provisioning process may include storing in a data store (such as a data store of the previously described management tools and/or coordination server) information that associates unique information for the portal device to its provisioned virtual machine. Such unique information for the portal device may correspond to portions of the authentication information (such as a login identification, certificate data, and/or a terminal identification number), that were stored in a data store of the portal device. Such unique information may also include a hardware identification number that is permanently embedded in the portal device such as a processor ID, network device number (e.g., MAC address) or other unique information. Such unique information may also include an IP address at which the portal device will be communicating from.

In an example embodiment, when the portal device initially communicates with a server at a specific server address stored in the portal device, the portal device and server may carry out an authentication process to enable the portal device to be granted access to a virtual machine. Such an authentication process may be carried out via components in the hypervisor of the server, the previously described management tools, and/or the banking machine virtual server itself. Also, it should be appreciated that the particular banking machine virtual machine that the portal device is connected to, may be based on the unique information provided by the portal device.

In this described embodiment, when a banking machine is initially powered on, the portal device may be operatively configured in response at least in part thereto, to automatically connect to a server at a particular server address stored in the memory of the portal device, authenticate itself and/or the server using the authentication information stored in the memory of the portal device, which results in a connection to a banking machine virtual machine without the need for servicer personnel at the banking machine to enter login information.

However, in an alternative embodiment, the portal device for a banking machine may not include all of the information needed to authenticate with a server in order to successfully connect to a banking machine virtual machine and/or to place the banking machine in a condition to be fully functional at a banking machine.

Figure 10:
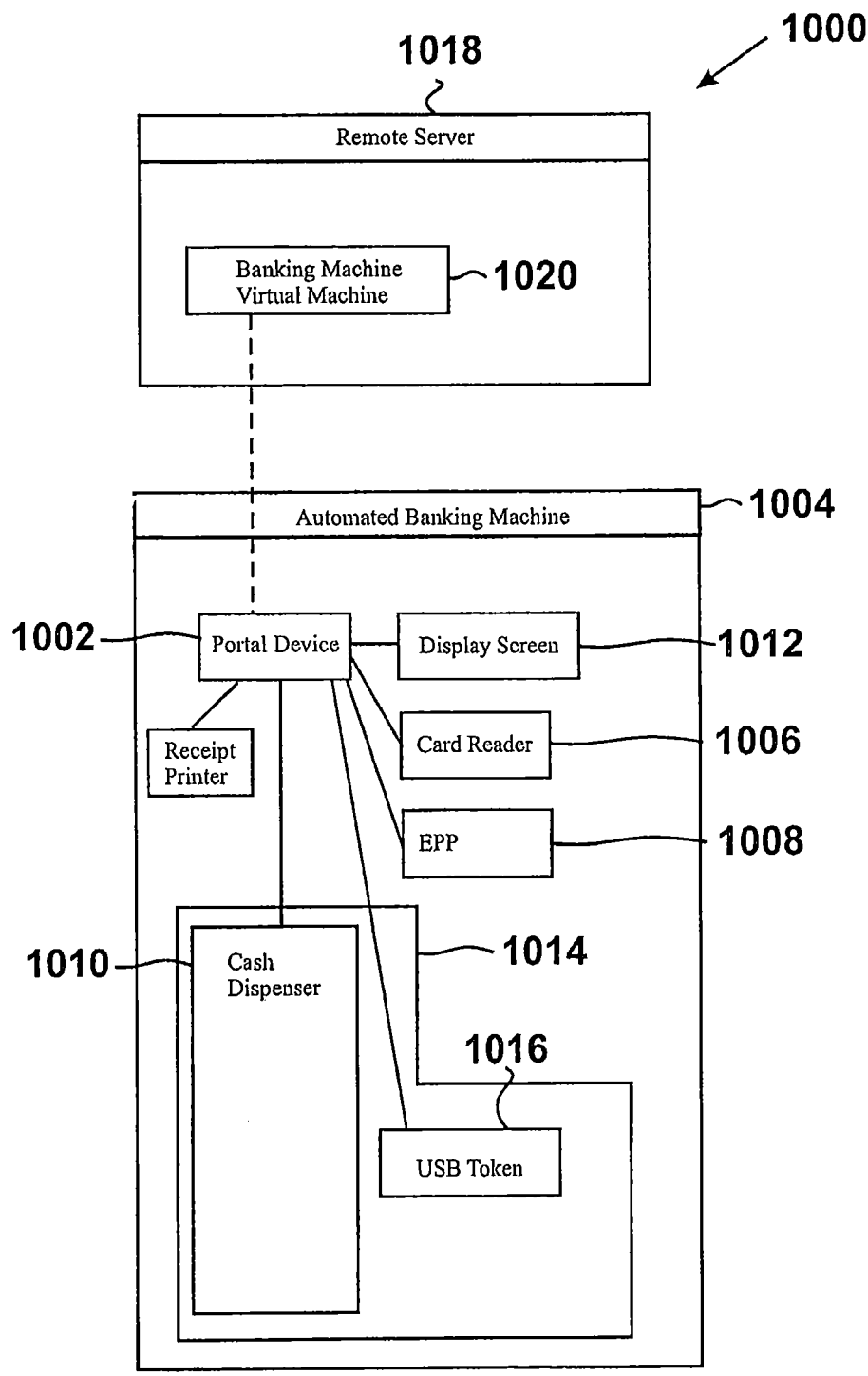
FIG. 10 is a schematic view illustrating an example automated banking machine in which a USB token is mounted in a chest of the banking machine.

FIG. 10 shows an example 1000 of an alternative banking machine embodiment. In this example, a portal device 1002 may be mounted in a banking machine 1004. Devices mounted in the banking machine 1004 such as a card reader 1006, an EPP 1008, and a cash dispenser 1010 may be operatively connected to the portal device 1002 via USB ports on the portal device. Also, a display 1012 may be connected to a display port of the portal device.

As illustrated in FIG. 10, at least portions of the cash dispenser (such as currency cassettes in which currency notes are stored) may be located in a chest 1014 (e.g., a safe) of the banking machine. In addition, in this described embodiment, the banking machine may include a token device that is also mounted inside the chest 1014 of the banking machine. Such a token device may correspond to a USB token that is removably connected via a USB cable to a USB port of the portal device 1002. In this described embodiment, the portal device is positioned in an upper portion of the banking machine that is located outside of the chest. Also, it should be appreciated that the display, card reader, and EPP are also positioned outside the chest. However, in an alternative embodiment both the portal device and the USB token may be located inside the chest 1014.

In this described alternative embodiment, the USB token device may include one or more data stores which comprise a memory that includes stored thereon all or portions of the previously described authentication information (e.g., client/server certificates, a login identification, a password, a terminal identification number, and/or any other information usable by the portal device to securely and automatically connect to and authenticate with a remote server and/or virtual machine through a network). For example, the portal device may be configured to acquire login data from the USB token. In one example embodiment, the portal device may itself validate the authentication information acquired from the USB token. Responsive to validation of the authentication information, the portal device may then operate to connect to (and authenticate with) a remote server 1018 for purposes of connecting to a particular virtual machine 1020.

In this described embodiment (in which the portal device validates at least some of the authentication information on the USB token) or in another alternative embodiment (in which the portal device does not validate the authentication information on the USB token), the portal device may communicate at least some of the authentication information acquired form the USB token to the remote server 1018. Here the remote server may authenticate or cause to be authenticated, the authentication information acquired from the USB token device. Responsive to authentication of at least some of the information on the USB token, the hypervisor of the server 1018 may place the portal device in operative connection with the banking machine virtual machine 1020 previously provisioned for use with the portal device. Alternatively, (or in addition) the hypervisor of the server 1018 may connect the portal device to the virtual machine, and the virtual machine may be operatively configured with authentication software (executing in the virtual machine) to validate authentication information acquired from the USB token prior to enabling the banking machine software operating in the virtual machine to carry out user transactions with the banking machine.

Figure 11:
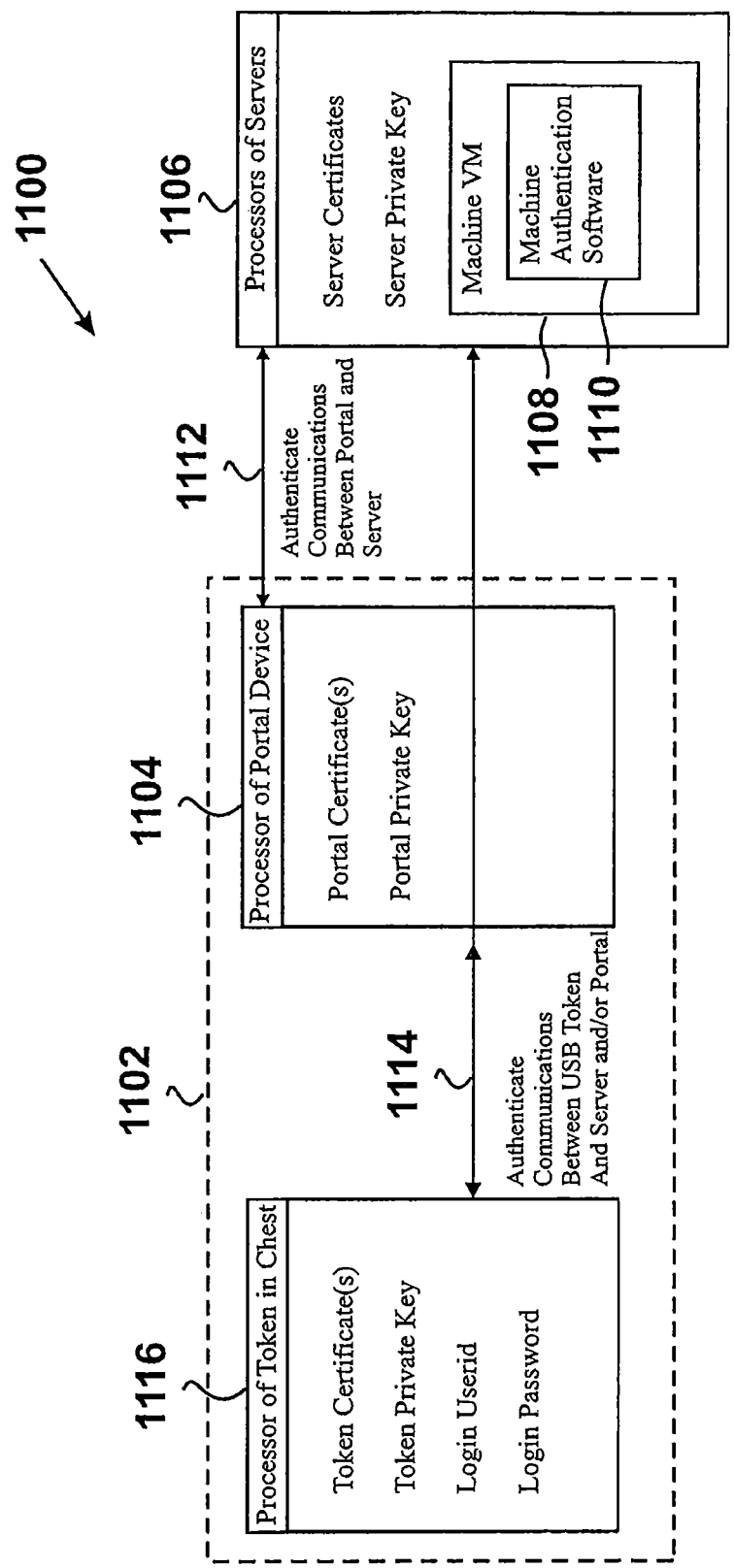
FIG. 11 is a schematic view illustrating an example authentication communication between a USB token, portal device and a remote server.

In addition, it should be appreciated that in further alternative example embodiments, the server 1118 and/or banking machine virtual machine 1120 may be operative to validate authentication information associated with both the portal device and the USB token device. FIG. 11 illustrates an example embodiment 1100 in which both the portal device and USB token are validated. In this example embodiment, when the banking machine 1102 is initially powered on, a processor 1104 in the portal device operates according to its firmware instructions and information stored in its memory to initiate communication with a processor 1106 in a remote server. As discussed previously, such a server may include a hypervisor with suitable software components that are adapted to interface with portal devices using a PCoIP protocol or other or other remote client protocol. In this described embodiment, authentication communications 1112 may be communicated between the portal processor 1104 and server processor 1106. Such authentication communications 1112 may by used by the portal device processor 1104 and the server processor 1106 to authenticate each other and/or to form a secure communication channel in which all further communications (such as PCoIP and USB communications) between the portal processor 1104 and sever processor 1106 are encrypted. Examples of authentication communications include SSL, TLS and VPN protocol communications, communications of login IDs and passwords, and/or any other communications operative to authenticate/validate the remote server and/or the portal device, and/or operative to establish encrypted communications between the remote server and the portal device.

As discussed previously, the server may acquire unique information for the portal device data from the portal processor, which information uniquely identifies the portal device. Responsive to this unique information, the server processor 1106 may create a network connection between the portal processor 1104 and a banking machine virtual machine 1108 (executing in the server processor 1106 or some other server processor) that was previously provisioned for use with the specific portal device. In this described embodiment, the banking machine virtual machine may be currently running or may be in a halted state. When in a halted state, the server processor 1106 may be operatively configured to cause the banking machine virtual machine 1108 to boot up. When the virtual machine 1108 is booted, the virtual machine may execute authentication software 1110. Also in embodiments where the banking machine virtual machine 1108 is already executing, the virtual machine may be operative to detect the initial connection of the portal device and responsive thereto cause the authentication software 1110 to execute.

In this described embodiment, the authentication software is operative to authenticate the USB token in the chest prior to enabling the virtual machine to operate banking machine software which places the banking machine in a mode capable of carrying out banking transaction for a user at the banking machine. In order to authenticate the USB token, authentication communications 1114 may be communicated between the authentication software 1110 and the USB token processor 1116 using USB communications (transferred between the portal device and the hypervisor using PCoIP communications). Such authentication communications 1114 may form a secure communication channel in which all further USB communications between the USB token processor 1116 and authentication software 1110 are encrypted. In this regard the banking machine virtual machine may include an operating system and suitable USB drivers in order to enable the authentication software to detect the USB token and communicate with the USB token. In an example embodiment, either or both of the token processor 1116 and the banking machine virtual machine 1108 may include certificates, keys, passwords, pins, that are usable to authenticate each other via the authentication communications 114. Examples of protocols, processes, and communications that may be used to carry out authentication communications 114 between the USB token and authentication software in a virtual machine are shown in U.S. Pat. No. 7,721,951 of May 25, 2010 and U.S. application Ser. No. 12/798,688 filed Apr. 9, 2010, which are hereby incorporated herein by reference in their entirety.

Once the authentication software has successfully authenticated the USB token processor 1116 in the chest of the banking machine 1102, the authentication software may direct other banking machine software operating in the virtual machine 1108 to place itself in a mode in which the banking machine 1102 is capable of carrying out banking transaction for a user.

In embodiments in which a USB token device is used to carry out at least some of the authentication processes needed to connect the banking machine hardware to a banking machine virtual machine, the previously described provisioning process may include configuring a USB token with any needed authentication information. When new banking machine hardware is being installed (or existing banking machine hardware is being reconfigured in the machine (e.g., a new card reader)), the provisioned USB token may be placed in the chest of the banking machine and may be connected to a USB port of a USB cable connected with a USB port of the portal device.

In many of the examples described herein, a banking machine has been updated and/or newly built to include the described portal device, display module, and other features described herein. However, it should be appreciated that the teachings herein may apply to many types of self-service terminals such as kiosks, gas pumps, DVD rental machines, gambling machines, toll machines, ticket issuing machines, fare collecting machines, and/or other types of machine having a general purpose computer that may be replaced with a portal device (or computer device providing comparable functions) capable of connecting to a virtual machine provisioned with software formerly executed in the general purpose computer of the terminal.

Also, it should be appreciated that in some embodiments the computer may remain in the existing banking machine (or other terminal) housing, and such a remaining computer may be modified to include portal software (e.g., VMware View). Such portal software may cause the computer to carry out equivalent functionality of the described portal device to connect to a remote server (via PCoIP) having a provisioned virtual machine executing software formerly operating in the computer of the (or other terminal).

The software applications, device drivers, modules, and components described herein used in operating the automated banking machines, remote banking machine computers, banking machine virtual machines, banking machine devices and other components described herein may correspond to computer executable instructions (e.g., whether software or firmware). Such instructions may be resident on and/or loaded from computer readable media or articles of various types into the respective processors. Such computer executable software instructions may be included on and loaded from one or more articles of computer readable media such as hard drivers, solid state drives, flash memory devices, CDs, DVDs, tapes, RAM, ROM and/or other local, remote, internal, and/or portable storage devices placed in operative connection with the automated banking machine and other systems described herein.

While the example embodiments include particular structures to achieve the desirable results, those having skill in the art may devise numerous other embodiments with other structures which employ the same principles described herein and which are encompassed by the subject matter as claimed.

Thus, the example embodiments achieve at least some of the above stated objectives, eliminate difficulties encountered in the making and use of prior devices, solve problems, and attain the desirable results described herein.

In the foregoing description, certain terms have been used for brevity, clarity, and understanding. However, no unnecessary limitations are to be implied therefrom, because such terms are for descriptive purposes and are intended to be broadly construed. Moreover, the descriptions and illustrations herein are given by way of examples, and the invention is not limited to the exact details shown and described.

In the following claims, any feature described as a means for performing a function will be construed as encompassing any means capable of performing the recited function, and will not be deemed limited to the particular means shown as performing that function in the foregoing description or mere equivalents thereof.

Having described the features, discoveries, and principles of the invention, the manner in which it is constructed and operated, and the advantages and useful results attained; the new and useful structures, devices, elements, arrangements, parts, combinations, systems, operations, methods, and relationships are set forth in the appended claims.

We claim:

1. Apparatus comprising:
an automated banking machine, wherein the automated banking machine is operative responsive at least in part to data read from data bearing records to cause financial transfers, wherein the automated banking machine includes:
a card reader, wherein the card reader is operative to read card data from user cards, wherein the card data corresponds to financial accounts,
a cash dispenser, and
a computer, wherein the computer includes at least one processor, wherein the computer includes a plurality of device ports and a network port,
wherein each of the card reader and cash dispenser is operatively connected to at least one of the device ports,
wherein the computer includes at least one software component, wherein the at least one software component is operative to execute in the at least one processor of the computer and cause the computer to cause device bus communications received through the device ports from the card reader and the cash dispenser to be communicated through the network port and through a network to at least one virtual machine operating in a further computer that is remote from the automated banking machine.

2. The apparatus according to claim 1, wherein the at least one software component is operative to execute in the at least one processor of the computer and cause the computer to cause device bus communications received through the network port and through the network from the virtual machine to be communicated through the device ports to the card reader and the cash dispenser.

3. The apparatus according to claim 2, wherein each of the device ports in operative connection with the card reader and the cash dispenser comprises a respective universal serial bus port, wherein the device bus communications correspond to universal serial bus communications.

4. The apparatus according to claim 2, wherein the at least one application is operative to execute in the at least one processor of the computer and cause the computer to cause at least one device bus communication received from a card reader device driver operating in the virtual machine to be communicated through at least one of the device ports to the card reader, which at least one device bus commination causes the card reader to deliver card data read through operation of the card reader to the computer in at least one further device bus communication, wherein the at least one software component is operative to execute in the at least one processor of the computer and cause the computer to cause the at least one further device bus communication received from the card reader to be communicated through the network port and through the network to the card reader device driver operating in the virtual machine.

5. The apparatus according to claim 4, wherein the card reader includes a shutter, wherein the at least one application is operative to execute in the at least one processor of the computer and cause the computer to cause at least one device bus communication received from the card reader device driver operating in the virtual machine to be communicated through the at least one device port to the card reader, which at least one device bus commination causes the shutter to open and enable the card to enter the card reader.

6. The apparatus according to claim 2, wherein the automated banking machine includes a keypad in operative connection with at least one of the device ports, wherein the at least one application is operative to execute in the at least one processor of the computer and cause the computer to cause at least one device bus communication received from a keypad device driver operating in the virtual machine to be communicated through the at least one device port to the keypad, which at least one device bus commination enables the keypad to receive manual inputs through the keypad and to deliver messages corresponding to the manual inputs to the computer in at least one further device bus communication, wherein the at least one software component is operative to execute in the at least one processor of the computer and cause the computer to cause the at least one further device bus communication received from the keypad to be communicated through the network port and through the network to the keypad device driver operating in the virtual machine.

7. The apparatus according to claim 6, wherein the at least one further device bus communication received from the keypad and communicated through the network port and through the network to the keypad device driver operating in the virtual machine, includes an encrypted personal identification number.

8. The apparatus according to claim 7, wherein the at least one device bus communication received from the keypad device driver operating in the virtual machine and communicated through the at least one device port to the keypad, causes the keypad to encrypt the manual inputs received through the keypad.

9. The apparatus according to claim 2, wherein the at least one application is operative to execute in the at least one processor of the computer and cause the computer to cause at least one device bus communication received from a cash dispenser device driver operating in the virtual machine to be communicated through at least one of the device ports to the cash dispenser, which at least one device bus commination causes the cash dispenser to dispense cash from the automated banking machine.

10. The apparatus according to claim 9, wherein the at least one application is operative to execute in the at least one processor of the computer and cause the computer to cause at least one further device bus communication received from the cash dispenser device driver operating in the virtual machine to be communicated through the at least one device port to the cash dispenser, which at least one further device bus commination causes the cash dispenser to pick a bill from a note holding canister in the automated banking machine.

11. The apparatus according to claim 9, wherein the at least one application is operative to execute in the at least one processor of the computer and cause the computer to cause at least one further device bus communication received from the cash dispenser device driver operating in the virtual machine to be communicated through the at least one device port to the cash dispenser, which at least one further device bus commination causes the cash dispenser to retract bills previously dispensed by the cash dispenser.

12. The apparatus according to claim 2, wherein the automated banking machine includes a receipt printer in operative connection with at least one of the device ports, wherein the at least one application is operative to execute in the at least one processor of the computer and cause the computer to cause at least one device bus communication received from a receipt printer device driver operating in the virtual machine to be communicated through the at least one device port to the receipt printer, which at least one device bus commination causes the receipt printer to print a receipt corresponding to an amount of cash dispensed through operation of the cash dispenser.

13. The apparatus according to claim 12, wherein the at least one application is operative to execute in the at least one processor of the computer and cause the computer to cause at least one further device bus communication received from the receipt printer device driver operating in the virtual machine to be communicated through the at least one device port to the receipt printer, which at least one further device bus commination causes the receipt printer to present the receipt from the automated banking machine.

14. The apparatus according to claim 12, wherein the computer includes at least one display port, wherein the automated banking machine includes at least one display in operative connection with the at least one display port, wherein the at least one application is operative to execute in the at least one processor of the computer and cause the computer to cause visual data received through the network port and through the network from the virtual machine to be outputted through the display.

15. The apparatus according to claim 2, further comprising the remote computer including the virtual machine.

16. The apparatus according to claim 15, wherein the device bus communications received from the virtual machine are generated responsive at least in part to device drivers operating in the virtual machine responsive at least in part to at least one automated banking machine application operating in virtual machine.

17. The apparatus according to claim 15, wherein the remote computer corresponds to a server that includes a plurality of virtual machines executing therein, wherein each virtual machine is operative to communicate device bus communications through at least one network to a respective different automated banking machine.

18. Apparatus comprising:
   at least one server that is operative to communicate through a network with a plurality of automated banking machines, wherein each automated banking machine is operative responsive at least in part to data read from data bearing records to cause financial transfers, wherein each automated banking machine includes:
      a card reader, wherein the card reader is operative to read card data from user cards, wherein the card data corresponds to financial accounts,
      a cash dispenser, and
      a computer, wherein the computer includes at least one processor, wherein the computer includes a plurality of device ports and a network port,
      wherein each of the card reader and cash dispenser is operatively connected to at least one of the device ports,
      wherein the server includes a plurality of virtual machines,
      wherein the computer of each automated banking machine includes at least one component, wherein the at least one component is operative to execute in the at least one processor of the computer and cause the computer to cause device bus communications received through the device ports from the card reader and the cash dispenser to be communicated through the network port and through the network to respective ones of the virtual machines operating in the server,
   wherein the server is operative responsive at least in part to card reader and cash dispenser device drivers operating in each of the virtual machines to cause further device bus communications to be communicated though the network and through the respective network ports of each respective automated banking machine so as to cause the at least one component in each respective automated banking machine to execute in the at least one processor of the computer of each respective automated banking machine to cause the computer to cause the further device bus communications to be communicated through the device ports to the card reader and the cash dispenser of the respective automated banking machine.

19. The apparatus according to claim 18, wherein each of the device ports in operative connection with the card reader and the cash dispenser of each respective automated banking machine comprises a respective universal serial bus port, wherein the device bus communications and further device bus communications correspond to universal serial bus communications.

20. Apparatus comprising:
   at least one server that includes at least one virtual machine operating therein that is operative to communicate through a network with at least one automated banking machine, wherein the at least one automated banking machine is operative responsive at least in part to data read from data bearing records to cause financial transfers, wherein each automated banking machine includes:
      a cash dispenser, and
      a computer, wherein the computer includes at least one processor, wherein the computer includes a plurality of universal serial ports and a network port,
      wherein the cash dispenser is operatively connected to at least one of the universal serial bus ports,
      wherein the virtual machine includes a cash dispenser device driver operating therein,
   wherein the computer of each automated banking machine includes at least one component, wherein the at least one component is operative to execute in the at least one processor of the computer and cause the computer to cause universal serial bus communications received through the at least one universal serial bus port from the cash dispenser to be communicated through the network port and through the network to the at least one virtual machine operating in the server,
   wherein the server is operative responsive at least in part to the cash dispenser device driver operating in the at least one virtual machine to cause further universal serial bus communications to be communicated though the network and through the network port of the at least one automated banking machine so as to cause the at least one component in the at least one automated banking machine to execute in the at least one processor of the computer of the at least one automated banking machine to cause the computer to cause the further universal serial bus communications to be communicated through the at least one universal serial bus port to the cash dispenser of the at least one automated banking machine.

* * * * *